(12) United States Patent
Tomita et al.

(10) Patent No.: US 8,950,245 B2
(45) Date of Patent: Feb. 10, 2015

(54) FUEL QUALITY DETERMINING METHOD, PROGRAM, COMPUTER READABLE RECORDING MEDIUM WHICH STORES THE PROGRAM, AND FUEL QUALITY DETERMINATION DEVICE

(75) Inventors: Eiji Tomita, Okayama (JP); Hiroshi Morinaka, Okayama (JP)

(73) Assignee: National University Corporation Okayama University, Okayama-shi (JP)

( * ) Notice: Subject to any disclaimer, the term of this patent is extended or adjusted under 35 U.S.C. 154(b) by 368 days.

(21) Appl. No.: 13/575,866

(22) PCT Filed: Jan. 28, 2011

(86) PCT No.: PCT/JP2011/051746
§ 371 (c)(1),
(2), (4) Date: Jul. 27, 2012

(87) PCT Pub. No.: WO2011/093446
PCT Pub. Date: Aug. 4, 2011

(65) Prior Publication Data
US 2012/0318054 A1    Dec. 20, 2012

(30) Foreign Application Priority Data

Jan. 29, 2010   (JP) ................................. 2010-018474

(51) Int. Cl.
*G01N 11/00*     (2006.01)
*G01N 33/22*     (2006.01)
*F02D 41/00*     (2006.01)

(52) U.S. Cl.
CPC ............... *F02D 41/005* (2013.01); *Y02T 10/47* (2013.01)

USPC .......................................... 73/53.01; 73/35.02

(58) Field of Classification Search
CPC .. F02D 41/005; F02D 35/022; F02D 19/0634
USPC .................... 73/23.01, 53.01; 422/78; 60/803
See application file for complete search history.

(56) References Cited

U.S. PATENT DOCUMENTS

| 2005/0022911 A1* | 2/2005 | Rusek et al. ....................... 149/1 |
| 2009/0038373 A1* | 2/2009 | Tomita et al. ................. 73/23.31 |

FOREIGN PATENT DOCUMENTS

| JP | 60-93155 | 5/1985 |
| JP | 2001-271648 | 10/2001 |
| JP | 2001-329905 | 11/2001 |
| JP | 2001-329906 | 11/2001 |
| JP | 2007-239739 | 9/2007 |
| JP | 4105742 | 4/2008 |

* cited by examiner

*Primary Examiner* — Hezron E Williams
*Assistant Examiner* — Marrit Eyassu
(74) *Attorney, Agent, or Firm* — Jordan and Hamburg LLP

(57) ABSTRACT

A value of ignition delay and a value of a flame spread rate are measured with respect to fuel which is an object to be determined. When the measured value of the ignition delay falls within a range which is smaller than a reference line and constitutes a first range or falls within a range which is larger than a reference line and constitutes the first range, goodness or badness of quality of fuel is determined based on goodness or badness of quality of fuel which is decided in accordance with the first range. When the measured value of ignition delay falls within a range between the reference line and a reference line which constitutes a second range, goodness or badness of quality of fuel is determined based on whether or not a measured value of a flame spread rate falls within a good product range.

7 Claims, 7 Drawing Sheets

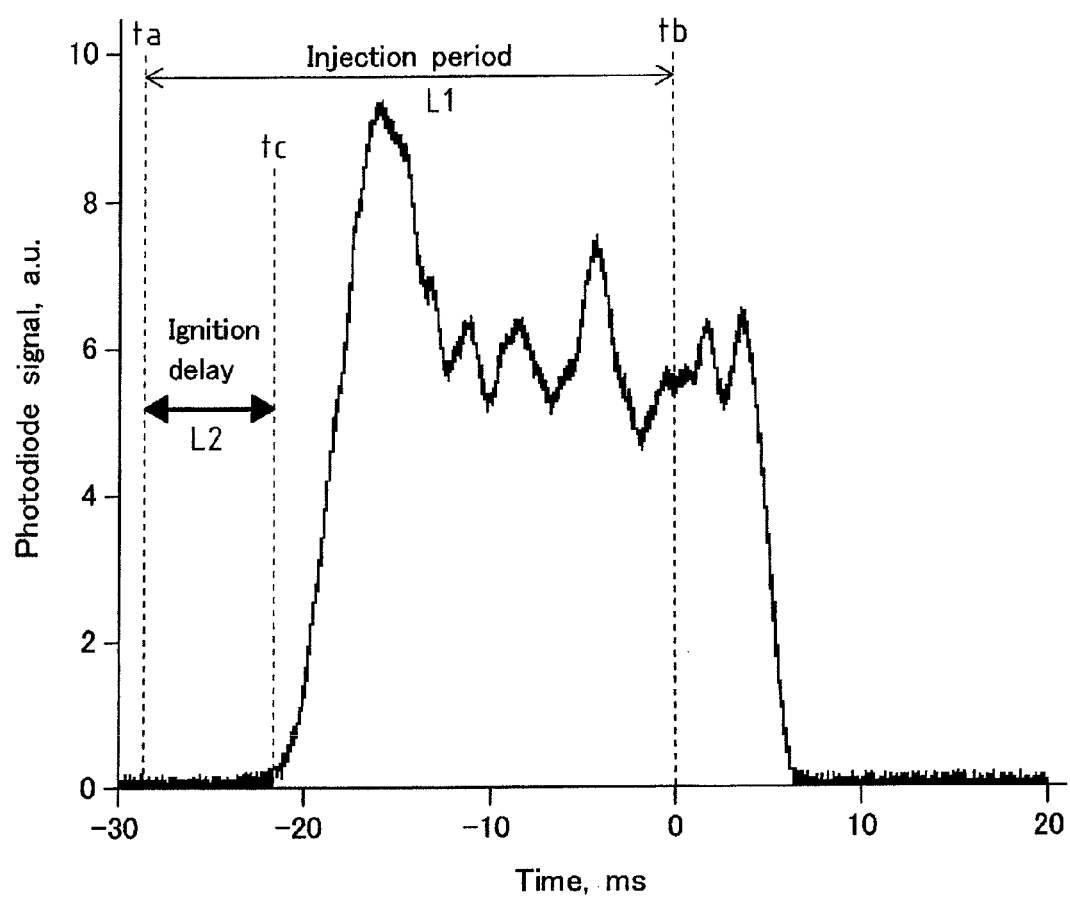

Fig. 5A  FUEL A  IGNITABILITY: GOOD, COMBUSTIBILITY: GOOD (NO COMBUSTION FAILURE)
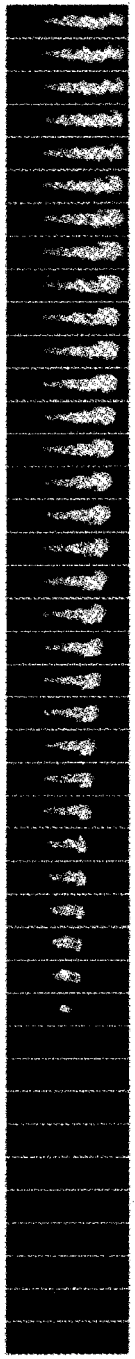
Fig. 5B  FUEL B  IGNITABILITY: BAD, COMBUSTIBILITY: GOOD (NO COMBUSTION FAILURE)
Fig. 5C  FUEL C  IGNITABILITY: GOOD, COMBUSTIBILITY: BAD (COMBUSTION FAILURE BEING PRESENT)
Fig. 5D  FUEL D  IGNITABILITY: BAD, COMBUSTIBILITY: BAD (COMBUSTION FAILURE BEING PRESENT)

FUEL QUALITY DETERMINING METHOD, PROGRAM, COMPUTER READABLE RECORDING MEDIUM WHICH STORES THE PROGRAM, AND FUEL QUALITY DETERMINATION DEVICE

BACKGROUND OF THE INVENTION

The present invention relates to, for example, a fuel quality determining method, a program, a computer readable recording medium which stores the program, and a fuel quality determination device which is used for inspecting quality of fuel (fuel oil) such as heavy oil used in a marine diesel engine.

Conventionally, as fuel for a marine diesel engine (diesel fuel) used mainly in foreign-bound ships, heavy oil is used. Heavy fuel contains a high rate of residue oil produced along with refining of crude oil. Such marine diesel fuel is also referred to as bunker oil.

Bunker oil contains a high rate of residue oil as described above and hence, components of bunker oil differs depending on a method for refining crude oil, a production site or the like and therefore quality of bunker oil is not uniform. Accordingly, a foreign-bound ship which refuels (fuel oil) by stopping at ports of countries other than ports of her own country receives refilling of fuel which differs in quality according to country since a crude oil refining method or the like differs from country to country. Further, depending on a country, there may be a case where a foreign-bound ship refuel with very poor quality fuel. Particularly, with the development of a technique for producing gasoline or the like from bunker oil by refining recent years, there has been observed a tendency where quality of bunker oil is lowered attributed to the extraction of gasoline from bunker oil.

Refueling with very poor quality fuel causes troubles relating to an engine. Particularly with respect to a marine diesel engine, scuffing is named as one of most serious troubles. Scuffing is a phenomenon where a piston (piston ring) slides relative to a cylinder (cylinder liner) in a state where a lubricant is in short supply in the engine so that a damage such as flaws and cracks occurs on a wall surface of the cylinder, and this scuffing may cause malfunction of the engine depending on the degree of the damage.

The mechanism that scuffing occurs is complicated, and the design of an engine, heat resistance of lubrication oil, an operation state of the engine, defective maintenance or the like is considered as a cause of the occurrence of scuffing. One of main causes of occurrence of scuffing is quality of fuel. To be more specific, when fuel has good quality, fuel injected into a combustion chamber of an engine is burnt out and disappears instantaneously after the injection of fuel is finished and hence, there is no possibility that the seizure of lubrication oil occurs between a piston and a cylinder. To the contrary, when fuel has vary poor quality, a flame of high temperature which is generated by fuel injected into a combustion chamber remains in the vicinity of a wall surface of a cylinder after the injection of fuel is finished and hence, the seizure of lubrication oil occurs between a piston and a cylinder thus giving rise to scuffing. In this manner, scuffing occurs due to worsening of lubrication property in an engine.

When quality of fuel to be supplied to an engine can be inspected in advance, the above-mentioned engine trouble can be obviated. With respect to the quality of fuel, ignitability is extremely important in the case of diesel fuel. This is because in the case where the fuel is not ignited, the combustion does not start. However, with respect to bunker oil (heavy oil), even when the combustion starts once, there may be a case where combustibility in succeeding combustion is bad. This drawback is brought about by a fact that bunker oil contains residue oil at a high rate as described above and a fact that the lowering of quality of bunker oil caused by the extraction of gasoline from bunker oil progresses.

To be more specific, a residue which is a product produced when gasoline is extracted from heavy oil has so high viscosity that the residue cannot be used as fuel. However, by mixing a byproduct which is produced along with the refining of gasoline from heavy oil into the residue, the adjustment of viscosity of the residue becomes possible. Here, the byproduct means an oil component which has low viscosity and exhibits poor ignitability and poor combustibility such as light cycle oil. Accordingly, bunker oil whose viscosity is adjusted by mixing the byproduct is inferior to bunker oil from which gasoline is not extracted in terms of ignitability and combustibility.

In this manner, there is a case where bunker oils completely differ from each other in terms of ignitability and combustibility although these oils have the substantially same viscosity. Accordingly, it is difficult to perform the inspection of quality of bunker oil based on viscosity, specific gravity or the like. Bunker oil is fuel so that, originally, quality of bunker oil such as ignitability and combustibility should be evaluated by analyzing components of bunker oil. However, bunker oil which contains residue oil at a high rate has an extremely large number of carbon atoms and hence, under a current situation, the analysis of components of bunker oil is technically difficult. Accordingly, the current circumstance is that quality of bunker oil cannot be inspected unless bunker oil is actually burnt.

As a method for inspecting quality of fuel by actually burning fuel, there have been mainly known a method where quality is determined based on a rate of heat generation by combustion of fuel, and a method where quality is determined based on a combustion state of fuel by observing a flame generated along with combustion of fuel.

In the former method, that is, in the method which determines quality of fuel based on a rate of heat generation based on combustion of fuel, a change in pressure in a combustion chamber where fuel is burnt is thermodynamically analyzed, a rate of heat generation is calculated based on combustion of fuel, a combustion state of fuel is estimated based on the calculated rate of heat generation. However, it is difficult to accurately determine quality of fuel by estimating a combustion state of fuel based on a change in pressure in the combustion chamber.

On the other hand, in the latter method, that is, in the method which determines quality based on a combustion state of fuel, quality of fuel is evaluated by directly observing a combustion state (flame) of fuel in a combustion chamber by a camera or the like through an observation window. As such a method where quality is determined based on a combustion state of fuel, there have been known techniques disclosed in JP-A-2001-329906 (patent document 1) and Japanese Patent 4105742 (patent document 2), for example.

The technique disclosed in patent document 1 is a technique where a length of a flame when fuel is injected and is burnt or a post combustion time where fuel is burnt in a succeeding manner after fuel injection is finished is used as an index, and data on good fuel which is obtained by measurement in advance and data on fuel which is an object to be inspected are compared to each other so as to determine goodness or badness of combustibility of fuel. Further, the technique disclosed in patent document 2 is a technique where ignition delay (time from injection of fuel to ignition) and a change in quantity of light immediately after starting combustion are used as indices, and grading of fuel or determination of fuel quality is performed using such indices.

However, the technique disclosed in patent document 1 has a drawback that it is difficult for a camera for observing a combustion state of fuel to acquire sufficient time resolution for determining quality of fuel in view of a cost or the like. Further, the number of data for determining quality of fuel is not sufficient. Further, conventional quality determinations including the determinations disclosed in patent document 1 and patent document 2 are not performed based on data of a result obtained by actually using fuel in an engine of a foreign-bound ship or the like. Actually, the result of determination based on the conventional quality determination is not sufficient in reliability in actually using fuel on which the result of determination is obtained.

SUMMARY OF THE INVENTION

The present invention has been made in view of the above-mentioned drawbacks, and it is an object of the present invention to provide a fuel quality determining method which can reflect the presence or the non-presence of occurrence of an engine trouble as a result of actual use of fuel thus enhancing reliability and accuracy of determination of quality, a program, a computer readable recording medium which stores the program, and a fuel quality determination device.

Solution to Problem

One aspect of the present invention is a fuel quality determining method for determining quality of fuel based on a combustion state of the fuel by injecting the fuel into a combustion chamber and burning the fuel, wherein a coordinate plane is provided in such a manner that the coordinate plane has a coordinate axis which indicates a value of ignition delay which is a time from fuel injection to fuel ignition and a coordinate axis which indicates a value of a flame spread rate which is an increase rate of a flame from a point of time immediately after fuel is ignited with respect to a plurality of fuels whose goodness and badness of quality determined based on the presence or the non-presence of a combustion failure as a result of an actual use of the fuels are already known, a first range which is at least either one of a range where a value of the ignition delay is smaller than a predetermined value with respect to the ignition delay and a range where the value of ignition delay is larger than a second predetermined value which is larger than the predetermined value with respect to the ignition delay, the first range being a range where goodness or badness of quality of fuel is univocally decided based on the value of ignition delay, and a second range which is a range between the predetermined value and the second predetermined value and in which the goodness or badness of quality of fuel is not univocally decided based on the value of the ignition delay are defined based on the distribution of the respective values on the coordinate plane, a determination reference which defines a range of values of the flame spread rate indicative of good products corresponding to the values of the ignition delay on the coordinate plane is used with respect to the flame spread rate within a range which includes the second range based on the distribution with respect to the plurality of materials, the value of ignition delay and the value of flame spread rate are measured with respect to fuel which is an object to be determined, the quality of the fuel which is an object to be determined is determined good when the measured value of the ignition delay falls within a range smaller than the predetermined value within the first range, and the quality of the fuel which is an object to be determined is determined bad when the measured value of the ignition delay falls within a range larger than the second predetermined value within the first range, and goodness or badness of quality of the fuel which is an object to be determined is determined based on whether or not the measured value of the flame spread rate falls within the good product range in accordance with the determination reference when the measured value of the ignition delay falls within the second range.

In the above-mentioned fuel quality determining method of the present invention, it is preferable that a reference line which defines the first range and the second range and a reference line which indicates the determination reference be displayed on the coordinate plane, and points on the coordinate plane which are decided based on the measured values of the ignition delay and the measured values of flame spread rate with respect to the fuel which is an object to be determined be displayed on the coordinate plane as measurement points.

In the above-mentioned fuel quality determining method of the present invention, it is preferable that in the case where the determination on whether or not the measured value of fuel spread rate falls within the good product range is not possible based on the determination reference, using the determination reference based on the distribution obtained at a temperature lower than a temperature in the combustion chamber when the distribution is obtained with respect to the plurality of fuels in the case, the determination on whether or not the measured value of the flame spread rate falls within the good product range is performed.

Another aspect of the present invention is a program for making a computer execute the above-mentioned fuel quality determining method, the program making the computer execute the steps of:

measuring a value of ignition delay and the value of the flame spread rate with respect to the fuel which is an object to be determined;

determining quality of the fuel which is an object to be determined good when the measured value of the ignition delay falls within the range smaller than the predetermined value within the first range, and determining quality of the fuel which is an object to be determined bad when the measured value of ignition delay falls within the range larger than the second predetermined value within the first range; and determining goodness or badness of the quality of the fuel which is an object to be determined based on whether or not the measured value of the flame spread rate falls within the good product range in accordance with the determination reference when the measured value of the ignition delay falls within the second range.

Yet another aspect of the present invention is a fuel quality determination device which includes:

a combustion chamber in which fuel injected from an injection nozzle is burnt;

a temperature adjustment means for adjusting a temperature in the combustion chamber before the injecting the fuel into the combustion chamber by the injection nozzle;

an injection control means for controlling the injection of the fuel by the injection nozzle;

a light detecting means for detecting light of a flame generated by the combustion of the fuel in the combustion chamber;

a combustion imaging means for acquiring continuous image data including a manner of combustion of the fuel in the combustion chamber by imaging the inside of the combustion chamber;

an ignition delay measurement means for measuring ignition delay which is a time from the injection of the fuel by the injection nozzle to the ignition of the fuel based on the detection of the light by the light detecting means;

a flame spread rate measurement means for measuring a flame spread rate which is an increase rate of the flame immediately after the ignition of the fuel injected by the injection nozzle based on the image data acquired by the combustion imaging means; and an analysis means for determining quality of the fuel based on the measured value of the ignition delay measured by the ignition delay measurement means and the measured value of the flame spread rate measured by the flame spread rate measurement means, wherein the analysis means provides a coordinate plane in such a manner that the coordinate plane has a coordinate axis which indicates a value of ignition delay which is a time from fuel injection to fuel ignition and a coordinate axis which indicates a value of a flame spread rate which is an increase rate of a flame from a point of time immediately after fuel is ignited with respect to a plurality of fuels whose goodness and badness of quality determined based on the presence or the non-presence of a combustion failure as a result of an actual use of the fuels are already determined, the analysis means defines a first range which is at least either one of a range where a value of the ignition delay is smaller than a predetermined value with respect to the ignition delay and a range where the value of ignition delay is larger than a second predetermined value which is larger than the predetermined value with respect to the ignition delay and in which goodness or badness of quality of fuel is univocally decided based on the value of ignition delay, and a second range which is a range between the predetermined value and the second predetermined value and in which the goodness or badness of quality of fuel is not univocally decided based on the value of the ignition delay are defined based on the distribution of the respective values on the coordinate plane, the analysis means uses a determination reference which defines a range of values of the flame spread rate indicative of good products which correspond to the values of the ignition delay on the coordinate plane with respect to the flame spread rate within a range which includes the second range based on the distribution with respect to the plurality of materials, the analysis means sets a temperature in the combustion chamber to a predetermined temperature by controlling the temperature adjustment means and the injection control means, and injects fuel which is an object to be determined from the injection nozzle and burns the fuel, the analysis means determines quality of the fuel which is an object to be determined good when the measured value of the ignition delay falls within the range smaller than the predetermined value within the first range, and determines quality of the fuel which is an object to be determined bad when the measured value of ignition delay falls within the range larger than the second predetermined value within the first range; and the analysis means determines goodness or badness of the quality of the fuel which is an object to be determined based on whether or not the measured value of the flame spread rate falls within the good product range in accordance with the determination reference when the measured value of the ignition delay falls within the second range.

In the fuel quality determining device according to the present invention, it is preferable that the analysis means further include: a display part which displays a reference line which defines the first range and the second range and a reference line which indicates the determination reference on the coordinate plane, and displays points on the coordinate plane which are decided based on the measured values of the ignition delay and the measured values of flame spread rate with respect to the fuel which is an object to be determined on the coordinate plane as measurement points.

In the fuel quality determining device according to the present invention, it is preferable that the analysis means, in the case where the determination on whether or not the measured value of fuel spread rate falls within the good product range is not possible based on the determination reference, determine whether or not the measured value of the flame spread rate falls within the good product range using the determination reference based on the distribution obtained at a temperature lower than a temperature in the combustion chamber when the distribution is obtained with respect to the plurality of fuels.

According to the present invention, it is possible to reflect the presence or the non-presence of occurrence of an engine trouble as a result of actual use of fuel thus enhancing reliability and accuracy of determination of quality.

BRIEF DESCRIPTION OF THE DRAWINGS

FIG. 4 is a view showing one example of a graph expressing a change in quantity of light brought about by combustion of fuel in the combustion chamber.

FIGS. 5A to 5D are views showing continuous image images expressing the manner of combustion of fuel in the combustion chamber.

DETAILED DESCRIPTION OF THE INVENTION

According to the present invention, indices which respectively indicate ignitability and combustibility of fuel are used, the determination references which are based on measured data on fuels whose goodness or badness of quality is already known through an actual use of the fuel are set in advance, and goodness or badness of quality of fuel is evaluated or determined based on the determination references. Hereinafter, an embodiment of the present invention is explained.

Figure 1:
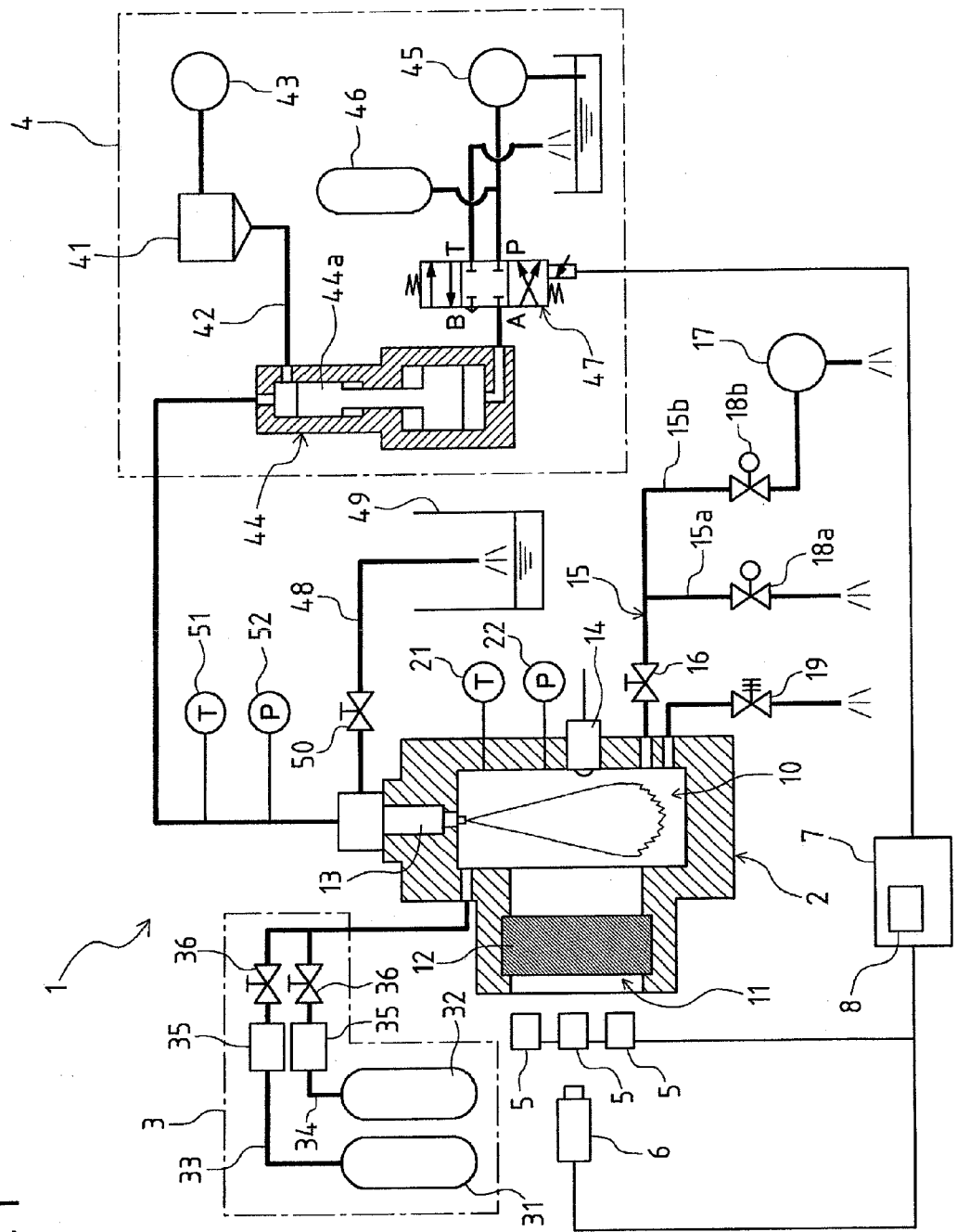
FIG. 1 is a view showing the overall constitution of a fuel quality determination device according to one embodiment of the present invention.

As shown in FIG. 1, a fuel quality determination device 1 according to the embodiment includes: a combustion chamber 2; an auxiliary combustion adjustment part 3; a fuel supply part 4; photo sensors 5; a camera 6; and a control part 7.

A combustion space 10 for burning fuel is formed in the combustion chamber 2. In this embodiment, the combustion chamber 2 is formed as a fixed volume container having approximately cylindrical shape, and the combustion chamber 2 is arranged in a posture where a cylindrical axis direction is aligned with the vertical direction. The combustion space 10 is formed as a cylindrical space having a diameter of 100 mm and a height of 330 mm. The combustion chamber 2 is constituted as a container made of metal such as stainless steel, for example.

An observation window 11 is provided to the combustion chamber 2. The observation window 11 is a window provided for allowing the observation of the manner of combustion of fuel in the combustion chamber 2 from the outside of the combustion chamber 2. The observation window 11 is mounted on a peripheral wall portion which forms the combustion space 10 in the approximately cylindrical combustion chamber 2. The observation window 11 is formed such that the inside of the combustion chamber 2 can be observed from the outside of the combustion chamber 2 through a quartz glass 12. The quartz glass 12 is mounted in the peripheral wall portion which forms the combustion space 10.

An injection nozzle 13 for injecting fuel into the combustion chamber 2 is mounted on the combustion chamber 2. The injection nozzle 13 is mounted on an upper portion of the combustion chamber 2 in a posture where an injection port is directed downwardly so that the injection nozzle 13 injects fuel into the combustion space 10 downwardly from above. In this manner, according to this embodiment, fuel injected from the injection nozzle 13 is burnt in the combustion chamber 2.

Further, an ignition plug 14 is mounted on the combustion chamber 2. The ignition plug 14 is mounted on the peripheral wall portion which forms the combustion space 10 in the combustion chamber 2, and the ignition plug 14 is connected to an igniter not shown in the drawing. The ignition plug 14 is provided for igniting a mixture gas supplied to the combustion chamber 2 from the auxiliary combustion adjustment part 3 as described later. The manner of operation of the ignition plug 14 is controlled by the control part 7.

Further, an exhaust pipe 15 for discharging a burnt gas in the combustion chamber 2 is connected to the combustion chamber 2. An exhaust control valve 16 is mounted on the exhaust pipe 15. The exhaust control valve 16 is a valve for switching a state of the burnt gas between an exhaust state where the burnt gas is discharged from the inside of the combustion chamber 2 and a non-exhaust state where the discharge of the burnt gas from the combustion chamber 2 is stopped. The exhaust control valve 16 is provided in the vicinity of a connection portion where the exhaust pipe 15 is connected to the combustion chamber 2.

The exhaust pipe 15 is, at a portion thereof downstream of the exhaust control valve 16, bifurcated into a natural exhaust pipe 15a for performing natural discharge by making use of a high pressure state in the combustion chamber 2 and a forced exhaust pipe 15b for performing forced discharge by a vacuum pump 17. The exhaust pipe 15, by the forced discharge of a burnt gas in the combustion chamber 2 by the vacuum pump 17, discharges the burnt gas in the combustion chamber 2 such that the retention of a residue generated after combustion is prevented as much as possible.

Open/close valves 18a, 18b for switching are mounted on the natural exhaust pipe 15a and the forced exhaust pipe 15b which constitute the exhaust pipe 15 respectively. A burnt gas in the combustion chamber 2 is efficiently and speedily discharged by an open/close control of these open/close valves 18a, 18b. The manner of operation of the exhaust control valve 16 and the open/close valves 18a, 18b mounted on the exhaust pipe 15 are controlled by the control part 7. Further, a safety valve 19 for ensuring safety under a situation where an atmospheric pressure in the combustion chamber 2 or the like changes is provided to the combustion chamber 2.

Further, a combustion-chamber-use thermometer 21 for measuring a temperature in the combustion chamber 2, and a combustion-chamber-use pressure gauge 22 for measuring pressure in the combustion chamber 2 are mounted on the combustion chamber 2. The combustion-chamber-use thermometer 21 is a thermocouple, for example, and the combustion-chamber-use pressure gauge 22 is a pressure conversion element, for example.

The auxiliary combustion adjustment part 3 is configured to adjust an ambient state including a temperature, a pressure and gas components in the combustion chamber 2. That is, the auxiliary combustion adjustment part 3 adjusts an ambient state in the combustion chamber 2 to a predetermined state in advance by generating combustion in the combustion chamber 2.

The auxiliary combustion adjustment part 3 includes an adjustment gas tank 31 and an ethylene gas tank 32. The adjustment gas tank 31 stores an adjustment gas made of oxygen into which nitrogen is mixed, and is connected to the combustion chamber 2 through an adjustment gas supply pipe 33. The ethylene gas tank 32 stores an ethylene gas as a fuel gas, and is connected to the combustion chamber 2 through an ethylene gas supply pipe 34.

That is, the auxiliary combustion adjustment part 3 supplies an adjustment gas in the adjustment gas tank 31 into the combustion chamber 2 through the adjustment gas supply pipe 33, and supplies an ethylene gas in the ethylene gas tank 32 into the combustion chamber 2 through the ethylene gas supply pipe 34. In this embodiment, the adjustment gas supply pipe 33 and the ethylene gas supply pipe 34 are connected to the combustion chamber 2 in a state where middle portions of these gas supply pipes 33, 34 are merged to each other.

A mass flow controller 35 and a control valve 36 are mounted on both the adjustment gas supply pipe 33 and the ethylene gas supply pipe 34. By the mass flow controller 35 and the control valve 36 mounted on the adjustment gas supply pipe 33, a flow rate of an adjustment gas supplied to the combustion chamber 2 from the adjustment gas tank 31 can be adjusted. By the mass flow controller 35 and the control valve 36 mounted on the ethylene gas supply pipe 34, a flow rate of an ethylene gas supplied to the combustion chamber 2 from the ethylene gas tank 32 is adjusted. The control valve 36 may be configured such that a control valve which is used in common by an adjustment gas and an ethylene gas is provided to a pipe portion downstream of a portion where the adjustment gas supply pipe 33 and the ethylene gas supply pipe 34 are merged to each other.

In this manner, by supplying an adjustment gas and an ethylene gas whose flow rates are adjusted respectively into the combustion chamber 2 by the auxiliary combustion adjustment part 3, a premixed gas where oxygen (O2), nitrogen (N2) and ethylene (C2H4) are mixed to each other at a predetermined rate is generated in the combustion chamber 2. As an adjustment gas to be stored in the adjustment gas tank 31, for example, an adjustment gas having the composition rate of 34% of oxygen and 66% of nitrogen is used.

The fuel supply part 4 is configured to supply fuel to be inspected by the fuel quality determination device 1 to the inside of the combustion chamber 2. The fuel supply part 4 includes a fuel tank 41. The fuel tank 41 stores fuel to be inspected, and is connected to the injection nozzle 13 through a fuel supply pipe 42. That is, the fuel supply part 4 supplies fuel in the fuel tank 41 to the injection nozzle 13 through the fuel supply pipe 42.

The fuel supply part 4 includes, as the constitution for pressurizing fuel to a predetermined pressure and for supplying the fuel to the injection nozzle 13, a compressor 43 and a fuel pump 44. The compressor 43 is connected to the fuel tank 41 and pressurizes the inside of the fuel tank 41. The fuel pump 44 is mounted on the fuel supply pipe 42, and forcibly feeds fuel supplied to the fuel supply pipe 42 from the fuel tank 41 to the injection nozzle 13.

The fuel pump 44 includes a piston 44a which is operated with working fluid, and is operated with the supply of working fluid. The supply of working fluid to the fuel pump 44 is performed by the constitution including an oil pump 45 and an accumulator 46. The oil pump 45 and the accumulator 46 are connected to the fuel pump 44 through the electromagnetically operated valve 47.

In the fuel supply part 4, fuel which is pressurized by the compressor 43 is further pressurized by the piston 44a which receives working fluid pressurized by the accumulator 46 and is pushed by working fluid, and is supplied to the injection nozzle 13. The operation of the electromagnetically operated valve 47 is controlled by the control part 7. With the use of the fuel supply part 4 having the above-mentioned constitution, the stable injection of fuel into the combustion space 10 from the injection nozzle 13 is ensured.

Further, a drain pipe 48 for discharging surplus fuel from fuel supplied to the injection nozzle 13 from the fuel supply part 4 is connected to a connection portion between the fuel supply pipe 42 and the injection nozzle 13. Fuel which is discharged through the drain pipe 48 is stored in a drain tank 49. An open/close valve 50 is mounted on the drain pipe 48.

On the fuel supply pipe 42, a fuel-use thermometer 51 for measuring a temperature of fuel to be injected from the injection nozzle 13 and a fuel-use pressure gauge 52 for measuring pressure of fuel to be injected from the injection nozzle 13 are mounted. The fuel-use thermometer 51 is a thermocouple, for example, and the fuel-use pressure gauge 52 is a pressure conversion element, for example.

The photo sensor 5 is provided for receiving and detecting light of a flame which is generated along with combustion of fuel in the combustion chamber 2. In this embodiment, the photo sensor 5 is arranged at three positions in a spaced-apart manner from each other in the vertical direction. In FIG. 1, for the sake of convenience of explanation, the photo sensor 5 is shown in a state where the photo sensor 5 faces the inside of the combustion chamber 2 through the observation window 11. In this embodiment, however, the photo sensor 5 is provided in a mode where the photo sensor 5 is embedded into a peripheral wall portion which forms the combustion space 10 in the combustion chamber 2, for example.

A detection signal outputted from the photo sensor 5 is inputted to the control part 7. With the use of the photo sensor 5, time resolution in observing a combustion state of fuel can be extremely easily enhanced, and a combustion state of fuel can be accurately and surely measured. In this manner, according to this embodiment, the photo sensor 5 functions as a light detecting means for detecting light of a flame generated by combustion of fuel in the combustion chamber 2. The mounting number and the arrangement of the photo sensors 5 are not particularly limited.

The camera 6 is a high-speed video camera and is provided for acquiring image data on a combustion state of fuel in the combustion chamber 2. The camera 6 is arranged in a state where the camera 6 faces the observation window 11 of the combustion chamber 2, and images a manner of combustion including the behavior of a flame generated by combustion of fuel in the combustion chamber 2 through the observation window 11 at a high imaging speed.

Image data acquired by the camera 6 is inputted to the control part 7. In this embodiment, the camera 6 acquires image data at time intervals of 0.5 ms (milliseconds). That is, the camera 6 images the manner of combustion in the inside of the combustion chamber 2 for every 0.5 ms. In this manner, according to this embodiment, the camera 6 functions as a combustion imaging means which acquires continuous image data including the manner of combustion of fuel in the combustion chamber 2 by imaging the inside of the combustion chamber 2.

The mounting number and the arrangement of the cameras 6 are not particularly limited. For example, by arranging the camera 6 at two portions, that is, an upper position and a lower position with respect to the observation window 11, a combustion state of fuel in the combustion chamber 2 can be observed in more detail. Further, with respect to the arrangement relationship between the camera 6 and the photo sensor 5, the photo sensor 5 is provided in a manner where, as described previously, the photo sensor 5 is embedded in the peripheral wall portion of the combustion chamber 2 or the like so that the photo sensor 5 is arranged in a state where the photo sensor 5 does not interfere with an image imaged by the camera 6.

The control part 7 controls respective parts of the fuel quality determination device 1 based on a predetermined program. The control part 7 includes a storing part which stores the program or the like, an arithmetic operation part which executes a predetermined arithmetic operation in accordance with the program or the like, a storage part which stores an arithmetic operation result or the like obtained by the arithmetic operation part and the like. The control part 7 is a computer having the constitution where a CPU (Central Processing Unit), a ROM (Read Only Memory), a RAM (Random Access Memory) and the like are connected with each other through a bus or the like, for example.

The control part 7 generates the combustion of fuel in the combustion chamber 2 by controlling the auxiliary combustion adjustment part 3 and the fuel supply part 4. The control part 7 performs an analysis of fuel, that is, the determination of quality of fuel based on data obtained by the photo sensor 5 and the camera 6 with respect to the combustion of fuel in the combustion chamber 2.

The control part 7, in order to generate the combustion of fuel in the combustion chamber 2, firstly, brings the inside of the combustion chamber 2 into a state where the combustion chamber 2 is filled with pseudo air of a predetermined pressure and a predetermined temperature by burning a premixed gas in the combustion chamber 2. The control part 7 generates the premixed gas in the combustion chamber 2 by controlling the auxiliary combustion adjustment part 3 and the ignition plug 14.

To be more specific, the control part 7, by controlling the mass flow controller 35 and the control valve 36 in the auxiliary combustion adjustment part 3, supplies a predetermined amount of adjustment gas and a predetermined amount of ethylene gas into the combustion chamber 2 thus generating a premixed gas where oxygen (O2), nitrogen (N2) and ethylene (C2H4) are mixed together at a predetermined rate in the combustion chamber 2. The control part 7 stops the supply of the adjustment gas and the ethylene gas into the combustion chamber 2 from the auxiliary combustion adjustment part 3 at a point of time that the inside of the combustion chamber 2 is filled with the premixed gas. The control part 7, after the supply of the gas into the combustion chamber 2 is stopped, transmits a signal to an igniter which is connected to the ignition plug 14 so as to operate the ignition plug 14 thus generating the combustion of the premixed gas filled in the combustion chamber 2.

Figure 2:
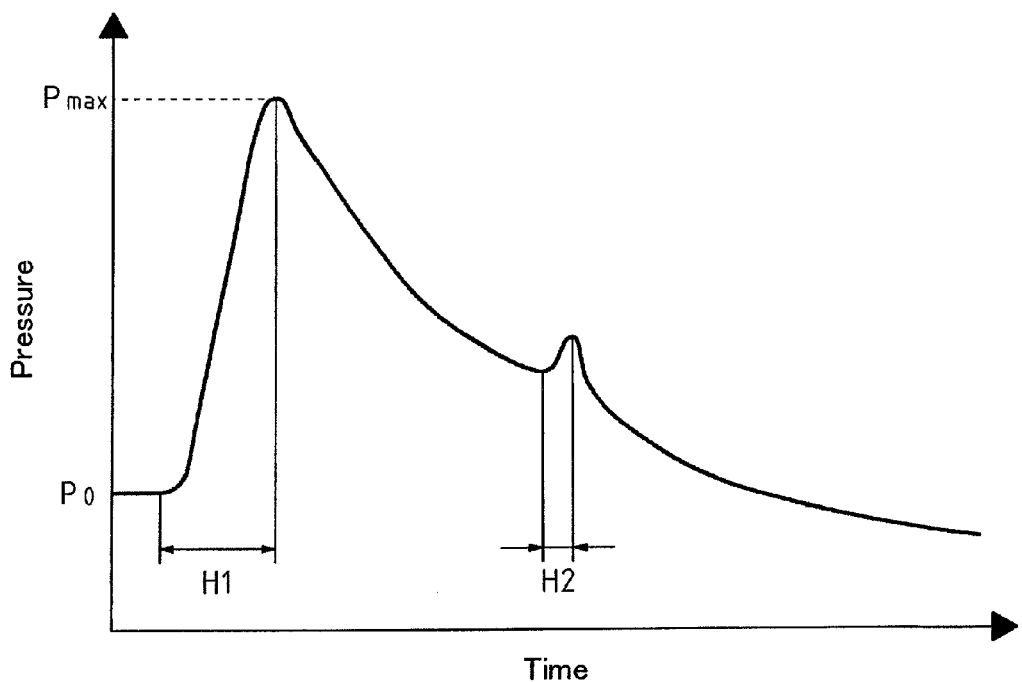
FIG. 2 is a view showing a graph expressing a change with time in pressure in a combustion chamber.

A pressure in the combustion chamber 2 is increased by burning a premixed gas in the combustion chamber 2. FIG. 2 shows a change with time of pressure in the combustion chamber 2. As shown in FIG. 2, a pressure in the combustion chamber 2 is elevated at a stroke to a value Pmax from a state of a value P0 due to the combustion of the premixed gas. That is, a period depicted by symbol H in the graph shown in FIG. 2 indicates a first combustion period which is a combustion period of a premixed gas in the combustion chamber 2, and a pressure in the combustion chamber 2 is elevated to the value Pmax from the value P0 in the first combustion period.

By burning the premixed gas in this manner, pseudo air is generated in the combustion chamber 2. In this embodiment, a pressure, a composition ratio and the like of the premixed gas are adjusted such that oxygen existing in pseudo air generated in the combustion chamber 2 amounts to approximately 21%. Here, an amount of oxygen (concentration of oxygen) in pseudo air generated in the combustion chamber 2 is suitably adjusted by adjusting a mixing amount of oxygen in an adjustment gas supplied to the combustion chamber 2 from the auxiliary combustion adjustment part 3, a mixing ratio between an adjustment gas and an ethylene gas supplied to the combustion chamber 2 or the like.

As shown in FIG. 2, a pressure in the combustion chamber 2 which is elevated to the value Pmax due to the combustion of the premixed gas is gradually lowered due to a heat loss. In this process where the pressure in the combustion chamber 2 is lowered, fuel is burnt by injecting fuel from the injection nozzle 13 at predetermined timing. That is, the control part 7, by controlling the fuel supply part 4 in a state where the inside of the combustion chamber 2 is filled with pseudo air by controlling the auxiliary combustion adjustment part 3 and the ignition plug 14, allows the injection of fuel from the injection nozzle 13 at predetermined timings thus generating combustion of fuel in the combustion chamber 2.

To be more specific, in a process where a pressure in the combustion chamber 2 is lowered from the value Pmax, at a point of time that the pressure in the combustion chamber 2 reaches a predetermined set pressure, the control part 7 performs a switching control of the electromagnetically operated valve 47 thus operating the fuel pump 44 thus allowing the injection of fuel from the injection nozzle 13 into the combustion chamber 2. In this embodiment, the injection of fuel from the injection nozzle 13 by the control part 7 is executed at a point of time that a pressure in the combustion chamber 2 reaches approximately 1.9 MPa (Mega Pascal), for example. Further, in this embodiment, an ambient state in the combustion chamber 2 is adjusted such that a temperature in the combustion chamber 2 becomes approximately 684K in a state where the pressure in the combustion chamber 2 is approximately 1.9 MPa.

Fuel injected into the combustion chamber 2 from the injection nozzle 13 is self-ignited in an ambient state in the combustion chamber 2 and the combustion of fuel is started. In other words, in a process where a pressure in the combustion chamber 2 is lowered, the injection of fuel into the combustion chamber 2 is started at a point of time that an ambient state such as a pressure or a temperature in the combustion chamber 2 is brought into a state which brings about natural ignition of injected fuel.

As shown in FIG. 2, due to the combustion of the fuel injected from the injection nozzle 13 in the combustion chamber 2, the pressure in the combustion chamber 2 is temporarily elevated in a process where the pressure in the combustion chamber 2 is gradually lowered. That is, in a graph shown in FIG. 2, a period depicted by symbol H2 indicates a second combustion period which is a combustion period of fuel in the combustion chamber 2, and the pressure in the combustion chamber 2 is temporarily elevated during this second combustion period.

Figure 3:
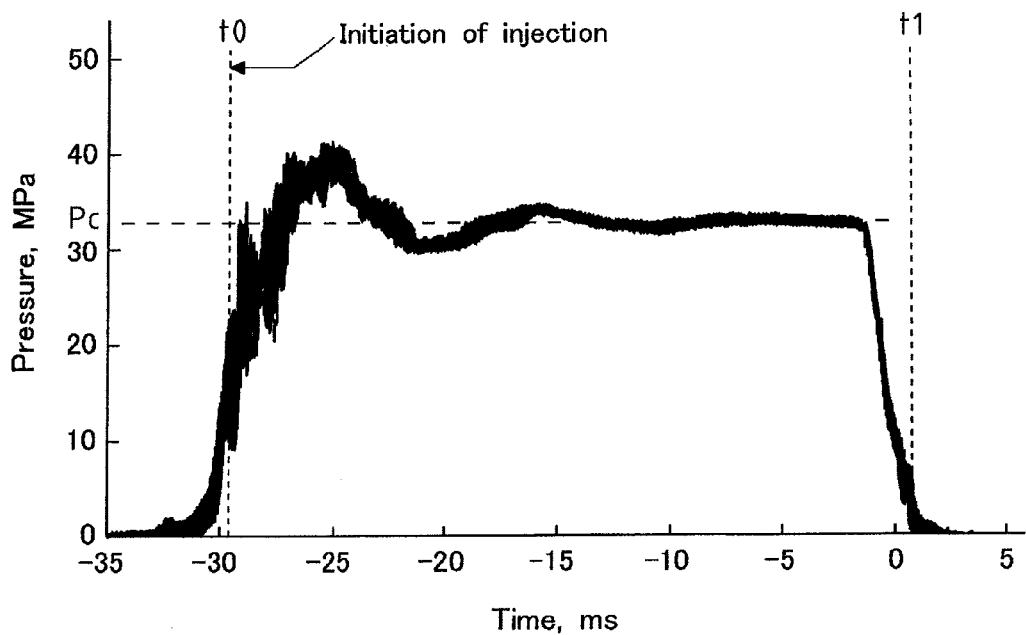
FIG. 3 is a view showing a graph where a change with time in pressure of fuel injected into the combustion chamber is expressed.

In this manner, fuel to be burnt in the combustion chamber 2 is supplied by the fuel supply part 4 in a stable manner. FIG. 3 shows a change with time of a pressure of fuel to be injected into the combustion chamber 2 from the injection nozzle 13 (hereinafter referred to as "fuel injection pressure"). The fuel injection pressure is measured by the fuel-use pressure gauge 52 as described previously. In FIG. 3, a time t0 is the initiation of fuel injection and a time t1 is a finish of fuel injection. The injection of fuel into the combustion chamber 2 is performed for approximately 30 ms.

As shown in FIG. 3, the fuel injection pressure is elevated along with the start of the fuel injection, is slightly lowered temporarily and, thereafter, is shifted at an approximately fixed value (see the value Pc). Then, the fuel injection pressure is sharply lowered from an approximately fixed state in response to generation of a control signal indicative of the finish of injection of fuel to the electromagnetically operated valve 47 or the like by the control part 7.

In a graph shown in FIG. 3, data obtained by overlapping respective data amounting to 30 repetitions of fuel injection is shown. As can be understood from the graph shown in FIG. 3, the respective data amounting 30 repetitions of fuel injection are overlapped with each other with the approximately same waveform. That is, the fuel quality determination device 1 acquires the excellent reproducibility with respect to the fuel injection pressure.

To be more specific, although the fuel injection pressure varies slightly for every injection of fuel during a period from the start of the injection of fuel to a point of time that the fuel injection pressure becomes an approximately fixed value, the fuel injection pressure of fuel takes the substantially same change mode in injection of respective times during a period after the fuel injection pressure becomes the approximately fixed value (see value Pc). In this manner, according to the fuel quality determination device 1 of this embodiment, the ideal pressure waveform can be realized with respect to the fuel injection pressure.

The control part 7 performs discharges of a burnt gas in the combustion chamber 2 after the combustion of fuel in the combustion chamber 2 is finished. The control part 7, for discharging a burnt gas in the combustion chamber 2, performs the discharge by opening the exhaust control valve 16 and the open/close valve 18a mounted on the natural exhaust pipe 15a and performs the forced discharge by opening the exhaust control valve 16 and the open/close valve 18b of the forced exhaust pipe 15b and by also operating the vacuum pump 17.

As described above, in the fuel quality determination device 1 of this embodiment, the auxiliary combustion adjustment part 3 functions as a temperature adjustment means for adjusting a temperature in the combustion chamber 2 before the injection of fuel performed by the injection nozzle 13. Further, in the same fuel quality determination device 1, the fuel supply part 4 also functions as an injection control means for controlling injection of fuel performed by the injection nozzle 13.

Using the fuel quality determination device 1 having the above-mentioned constitution, the determination of fuel quality is performed. The fuel quality determining method of this embodiment uses ignition delay which is a time from the injection of fuel to the ignition of fuel and a flame spread rate which is an increase rate of flame from a point of time immediately after fuel is ignited as indices. According to the fuel quality determining method of this embodiment, in view of the fact that a parameter referred to as ignition delay indicative of ignitability is important in determining goodness or badness of quality of fuel, in addition to this ignition delay, a parameter referred to as a flame spread rate indicative of combustibility after ignition of fuel is focused thus accurately determining goodness or badness of quality of fuel.

In the fuel quality determination device 1 according to this embodiment, the ignition delay is a time from the injection of fuel by the injection nozzle 13 to the ignition of fuel, that is, a time from a point of time that the injection of fuel by the injection nozzle 13 is started to a point of time that fuel injected from the injection nozzle 13 is ignited. In the fuel quality determination device 1, the ignition delay is measured by the control part 7.

The control part 7 measures the ignition delay based on a detection signal inputted from the photo sensor 5. To be more specific, the control part 7, for example, measures the start time of the injection of fuel by the injection nozzle 13 based on a control signal or the like transmitted to the electromagnetically operated valve 47 for operating the fuel pump 44 in injecting fuel from the injection nozzle 13. Further, the control part 7 measures a point of time that light of a flame which is generated by starting of combustion of fuel injected from the injection nozzle 13 is detected by the photo sensor 5 based on an input signal from the photo sensor 5 is measured as a point of time that fuel is ignited. The control part 7 measures ignition delay based on the measured start time of the ignition of fuel and the measured point of time that fuel is ignited.

FIG. 4 shows one example of a change in quantity of light generated along with the combustion of fuel which is detected by the photo sensor 5. In FIG. 4, a period L1 from a time ta which is a point of time that the injection of fuel is started to a time tb which is a point of time that the injection of fuel is finished is a fuel injection period. Further, in a graph shown in FIG. 4, timing of fuel ignition corresponds to a time tc which is timing at which a quantity of light detected by the photo sensor 5 is rapidly increased after a point of time (time ta) at which the injection of fuel is started. Accordingly, in the graph shown in FIG. 4, a period L2 from the time ta which is the point of time that the injection of fuel is started to the time tc which is the timing of the ignition of fuel is ignition delay. Such ignition delay is measured as a length of time by the control part 7.

In this manner, the control part 7 includes a functional part for measuring ignition delay based on a detection signal inputted from the photo sensor 5. That is, in the fuel quality determination device 1 of this embodiment, the control part 7 functions as ignition delay measurement means for measuring ignition delay based on the detection of light of a flame by the photo sensor 5.

In this embodiment, a flame spread rate which is used as a parameter in the determination of fuel quality is the degree of spread of a flame in a transition region in a so-called combustion initial period from a point of time immediately after fuel is ignited to a point of time that the flame becomes stable. In other words, the flame spread rate is a change rate at which the flame is increased along with a lapse of time from a point of time immediately after fuel is ignited. The flame spread rate is measured based on image data obtained by imaging a flame generated by combustion of fuel.

In the combustion chamber 2, with the elevation of a gas temperature of a portion of ignited fuel, a gas around the portion is ignited. Diesel combustion (combustion of diesel fuel) is a phenomenon where a flame grows due to such a chain of the temperature elevation of the gas and the ignition of the gas. In the diesel combustion, an ambient temperature is relatively important at a point of time that fuel is firstly ignited. However, once the ignition of fuel starts, a temperature of an ambient burnt gas becomes more important than the ambient temperature, In the fuel quality determination device 1 of this embodiment, the combustion of fuel is the combustion in the combustion chamber 2 having a relatively large volume and hence, a pressure in the combustion chamber 2 is not highly elevated during the combustion. The elevation of pressure is the elevation of approximately 3% at a point of time that the combustion is finished. To the contrary, when a temperature of ambient burnt gas is elevated, a temperature of the gas is locally elevated due to the heat radiation and the heat transfer from the flame so that the fuel is ignited. This ease of ignition of fuel leads to the good combustibility of fuel. That is, combustibility (flame spread rate) of fuel is relatively largely influenced by the temperature of the ambient gas.

In the fuel quality determination device 1 of this embodiment, the flame spread rate is an increase rate of a flame from a point of time immediately after fuel injected by the injection nozzle 13 is ignited. In the fuel quality determination device 1, the flame spread rate is measured by the control part 7.

The control part 7 measures a flame spread rate based on image data inputted from the camera 6. To be more specific, as a flame spread rate, the control part 7 measures a change rate with time of an area of a flame in a predetermined period from a point of time immediately after the ignition of fuel injected from the injection nozzle 13. That is, with respect to an area A (cm2) of a flame in image data obtained by the camera 6, a change rate with time of the area A, that is, $\Delta A/\Delta t$ (cm2/sec) is calculated as a flame spread rate. In this embodiment, the control part 7 measures a flame spread rate for 1.5 ms from a point of time that fuel is ignited based on image data acquired by the camera 6 at intervals of 0.5 ms as described above.

Accordingly, in this embodiment, the control part 7 measures a flame spread rate based on 4 pieces of continuous image data in total constituted of image data at a point of time where the ignition of fuel starts (0.0 ms), image data at a point of time after a lapse of 0.5 ms from the start of the ignition of fuel, image data at a point of time after a lapse of 1.0 ms from the start of the ignition of fuel, and image data at a point of time after a lapse of 1.5 ms from the start of the ignition of fuel which are acquired by the camera 6 at the intervals of 0.5 ms. Then, an increase rate of an area of a flame in image data at each point of time is measured as a flame spread rate.

Here, the area of the flame in each image data is measured in such a manner that, for example, image data obtained by the camera 6 is subjected to image processing such as binary processing so that a portion of the flame in image data is extracted and the area of the flame is measured based on an area (for example, the number of pixels) of the portion of the flame. Further, as described previously, as the measured value of a flame spread rate based on 4 pieces of image data, for example, an average value of increase rates of areas of flames between two continuous image data is used.

In this manner, the control part 7 includes the functional part for measuring a flame spread rate based on image data inputted from the camera 6. That is, in the fuel quality determination device 1 of this embodiment, the control part 7 functions as a flame spread rate measurement means which measures a flame spread rate based on image data obtained by the camera 6.

In this embodiment, as a flame spread rate, a spread rate of an area of a two-dimensional flame is adopted. However, for example, it may be possible to adopt a spread rate of a three-dimensional flame as the flame spread rate by imaging a manner of ignition of fuel at different angles using plural sets of cameras. However, from a viewpoint that the measurement of a flame spread rate is performed with respect to an initial stage of combustion of fuel, with the use of the spread rate of the two-dimensional flame, it is possible to sufficiently cope with the spread rate of the actual three-dimensional flame. Further, by adopting the spread rate of an area of the two-dimensional flame as the flame spread rate, image data can be acquired by one set of camera 6. Accordingly, the adoption of the spread rate of the two-dimensional flame area contributes to the simplification of the constitution for imaging the combustion of fuel.

In the determination of fuel quality, the above-mentioned ignition delay is an important parameter for evaluating ignitability of fuel. In an actual operation, in a diesel engine, usually, it is considered that goodness or badness of ignitability of fuel influences the performance of an engine, and the shorter ignition delay, the better quality the fuel has. Further, it is also considered that fuel with an extremely long ignition delay exhibits bad combustibility. However, there is a case where fuel with a short ignition delay also has bad combustibility after ignition. That is, for example, even the fuel with a short ignition delay has a possibility of causing a combustion failure so that it is difficult to generalize the evaluation or the determination of goodness or badness of quality of fuel based on only whether ignition delay is long or short. Here, the combustion failure is the occurrence of scuffing in an engine mainly caused by defective quality of fuel, The relevance between ignitability and combustibility of fuel and the presence or non-presence of the combustion failure is explained using an example of a result of an analysis shown in FIG. 5. In this embodiment, the analysis is carried out with respect to four kinds of fuels (fuel A, fuel B, fuel C and fuel D) having typical properties respectively.

FIG. 5A to FIG. 5D respectively show 41 pieces of continuous imaged images (image data) in total (for 20 ms) including images at the time of ignition of fuel in the combustion chamber 2 which are obtained by the camera 6. In respective FIG. 5A to FIG. 5D, each portion defined by a rectangular shape is one piece of imaged image (image data), and a white portion in each imaged image expresses a frame portion and a black portion indicates a background. Further, image data shown in FIG. 5A to FIG. 5D share the axis of time with respect to the injection timing of fuel.

FIG. 5A shows image data on fuel A. As can be understood from the flame appearing timing and a manner of a change in an area of a flame from the ignition of the fuel (the degree of growth of the flame) shown in FIG. 5A, the fuel A exhibits a relatively short ignition delay so that the fuel A has good ignitability, and the fuel A has a relatively large flame spread rate so that the fuel A has good combustibility. In this manner, the fuel A having the good ignitability and good combustibility does not generate a combustion failure as a result of an actual use thereof. That is, it is safe to say that the fuel A is a good product.

FIG. 5B shows image data on fuel B. As can be understood from the flame appearing timing and a manner of a change in an area of a flame from the ignition of the fuel (the degree of growth of the flame) shown in FIG. 5B, although the fuel B exhibits a relatively long ignition delay so that the fuel B has bad ignitability, the fuel B has a relatively large flame spread rate so that the fuel B has good combustibility. In this manner, the fuel B whose ignitability is bad but combustibility is good does not generate a combustion failure in an actual use thereof. That is, it is safe to say that the fuel B is a good product.

FIG. 5C shows image data on fuel C. As can be understood from the flame appearing timing and a manner of a change in an area of a flame from the ignition of the fuel (the degree of growth of the flame) shown in FIG. 5C, although the fuel C exhibits a relatively short ignition delay so that the fuel C has good ignitability, the fuel C has a relatively small flame spread rate so that the fuel C has bad combustibility. In this manner, the fuel C whose ignitability is good but combustibility is bad generates a combustion failure as a result of an actual use thereof. That is, it is safe to say that the fuel C is a bad product.

FIG. 5D shows image data on fuel D. As can be understood from the flame appearing timing and a manner of a change in an area of a flame from the ignition of the fuel (the degree of growth of the flame) shown in FIG. 5D, the fuel D exhibits a relatively long ignition delay so that the fuel D has bad ignitability, and the fuel D has a relatively small flame spread rate so that the fuel D has bad combustibility. In this manner, the fuel C having bad ignitability and bad combustibility generates a combustion failure as a result of an actual use thereof. That is, it is safe to say that the fuel D is a bad product.

As can be understood from the above-mentioned example of the result of the analysis, there is the case where although ignitability is good (although the ignition delay is short), combustibility after the ignition is bad so that the fuel has a problem. To the contrary, there is the case where although ignitability is bad (although the ignition delay is long), combustibility after the ignition is good so that the fuel does not have a problem. Accordingly, there are cases where goodness or badness of quality of fuel cannot be always accurately evaluated or determined based on only the goodness or badness of ignitability, that is, only the length of the ignition delay. In view of the above, in the fuel quality determination method according to this embodiment, in addition to the ignition delay, a flame spread rate which is indicative of combustibility of fuel is adopted.

In the fuel quality determination device 1, the determination of fuel quality is performed by the control part 7 based on ignition delay and a flame spread rate. That is, the control part 7 includes, as described previously, the functional part for measuring the ignition delay and the functional part for measuring the flame spread rate, and also includes the functional part for determining quality of fuel based on the ignition delay and the flame spread rate which are measured by the respective functional parts. In this manner, in the fuel quality determination device 1 of this embodiment, the control part 7 functions as an analysis means for determining quality of fuel based on a measured value of ignition delay and a measured value of flame spread rate which are measured by the respective functional parts.

The fuel quality determination method according to this embodiment is provided for determining quality of fuel based on a combustion state of fuel by injecting fuel into the combustion chamber 2 thus burning the fuel, and uses a first determination reference which is the determination reference for ignition delay and a second determination reference which is the determination reference for a flame spread rate corresponding to the value of the ignition delay.

The first determination reference defines a first range where goodness or badness of quality of fuel is univocally decided based on a value of ignition delay and a second range where goodness or badness of quality of fuel is not univocally decided based on the value of the ignition delay with respect to the ignition delay. The first determination reference, from a viewpoint that fuel is a good product when the value of the ignition delay is apparently small and the fuel is a bad product when the value of the ignition delay is apparently large to the contrary, defines at least one out of a range where a value of ignition delay is smaller than a predetermined value and a range where the value of the ignition delay is larger than a predetermined value from other ranges with respect to the value of the ignition delay.

Figure 6:
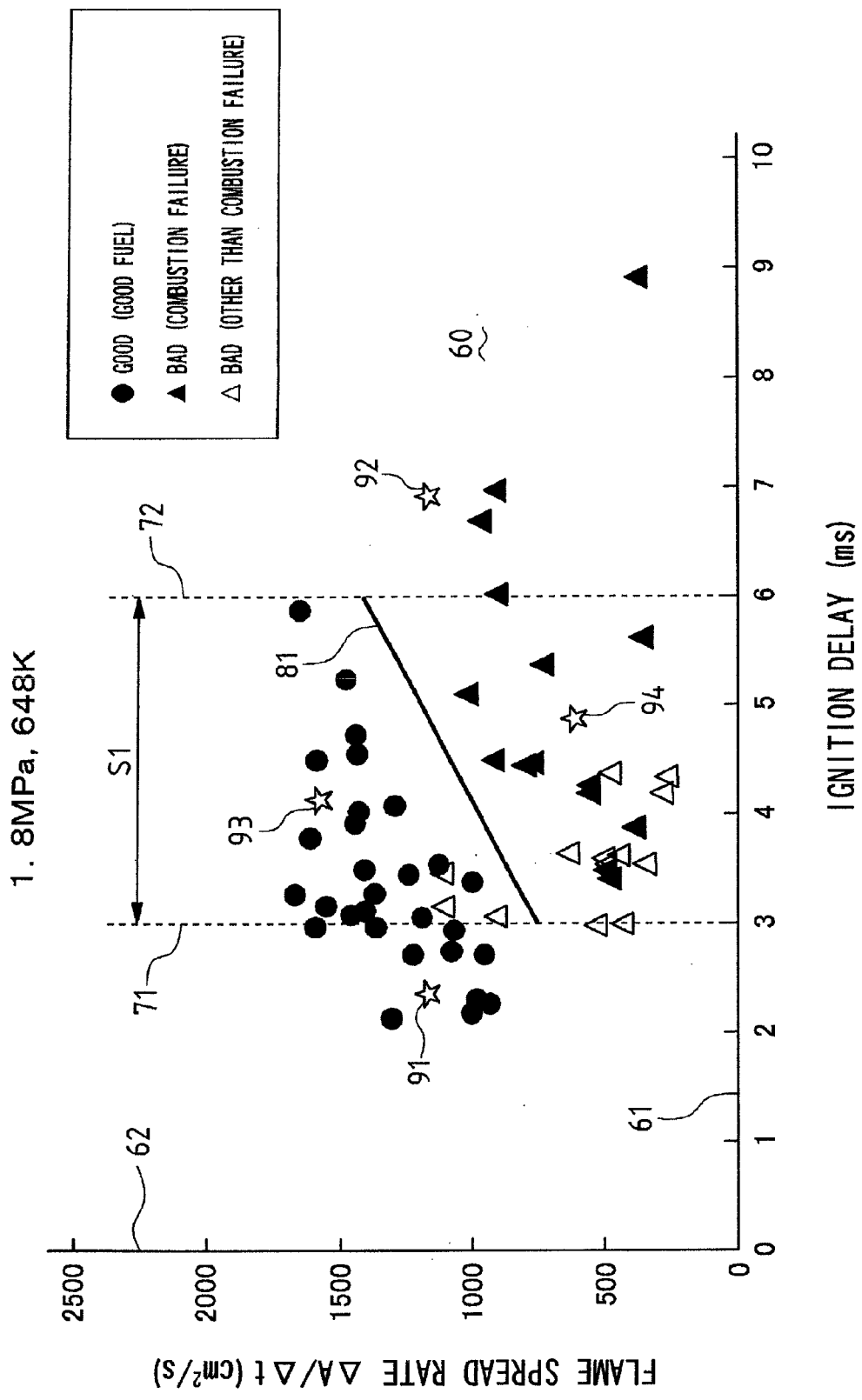
FIG. 6 is an explanatory view of a fuel quality determining method according to one embodiment of the present invention.

To be more specific, the first determination reference, for example, as shown in FIG. 6, defines a range where the value of the ignition delay is 3 ms or less (see a reference line 71) and a range where the value of the ignition delay is 6 ms or more (see a reference line 72) as the first range, and a range where the value of the ignition delay is more than 3 ms and less than 6 ms (see symbol S1) as the second range. That is, in the range where the value of the ignition delay is 3 ms or less, the ignition delay is short so that the fuel is a good product whereby goodness or badness of quality of fuel is univocally decided, while in the range where the value of the ignition delay is 6 ms or more, the ignition delay is long so that the fuel is a bad product whereby the quality of the fuel is univocally decided.

The second determination reference is set based on the distribution of values of ignition delay and values of flame spread rate with respect to a plurality of fuels whose goodness or badness of quality is determined as a result of an actual use of the fuels. FIG. 6 shows a coordinate plane 60 having a first coordinate axis 61 which is a coordinate axis indicative of values of ignition delay and a second coordinate axis 62 which is a coordinate axis indicative of values of a flame spread rate. One example of the distribution of values of the ignition delay and values of flame spread rate is shown on the coordinate plane 60.

The distribution of values of the ignition delay and values of flame spread rate is the distribution of, for example, measurement points obtained from values of the ignition delay and values of flame spread rate measured by the fuel quality determination device 1 of this embodiment with respect to a large number of (a large kinds of) fuels whose goodness or badness of quality is already determined as a result of an actual use of the fuels. Hereinafter, data indicative of the distribution of values of the ignition delay and values of flame spread rate shown in FIG. 6 is referred to as "distribution data".

Goodness or badness of quality which is known in advance with respect to respective fuels whose ignition delay and flame spread rate are to be measured for acquiring distribution data is based on the presence or non-presence of combustion failures when the fuels are actually used as fuels for an engine. The distribution data according to this example is a measurement result of ignition delays and flame spread rates of fuels where the presence or non-presence of a combustion failure is known.

The distribution data shown in FIG. 6 is data obtained when the measurement of the ignition delays and flame spread rates of fuels is performed in an ambient state where a pressure in the combustion chamber 2 is 1.8 MPa and a temperature in the combustion chamber 2 is 648K. In the distribution data shown in FIG. 6, "•" (black dot) indicates data on fuels which are good products (no combustion failure), and "▲" (black triangle) indicates data on fuels which are bad products (combustion failure being present). The distribution data according to this example includes data on 29 samples of fuels which are good products ("•") and data on 15 samples of fuels which are bad products (combustion failure) ("▲").

In FIG. 6, "△" (white triangle) in the distribution data indicates data on fuel where an engine trouble occurs due to a reason other than a combustion failure due to quality of fuel (mainly combustibility) as a result of an actual use of fuels. The distribution data according to this example includes data on 13 samples of fuels which are bad products ("△") having failures other than combustion failure.

In such distribution data, data on respective samples is distributed on the coordinate plane 60 in a divided manner between data on good products and data on bad products. This implies that fuels which are good products exhibit the tendency where ignition delay is relatively short and a flame spread rate is relatively large, while fuels which are bad products exhibit the tendency where ignition delay is relatively long and a flame spread rate is relatively small.

Accordingly, in the distribution data shown in FIG. 6, to focus on the distribution of data with respect to ignition delay (the distribution of the data in the first coordinate axis 61 direction), data on good products ("•") is mainly distributed on a side where the ignition delay is short (left side), and data on bad products ("▼") is mainly distributed on a side where the ignition delay is long (right side). However, in the range where goodness or badness of quality is not univocally decided based on a value of the ignition delay, that is, in the second range defined in accordance with the first determination reference described previously (see symbol S1), data on good products and data on bad products are present in mixture irrespective of the value of the ignition delay.

On the other hand, in the distribution data shown in FIG. 6, to focus on the distribution of data with respect to a flame spread rate (the distribution of the data in the second coordinate axis 62 direction), data on good products ("•") is mainly distributed on a side where the flame spread rate is large (upper side), and data on bad products ("▲") is mainly distributed on a side where the flame spread rate is small (lower side). Accordingly, on the coordinate plane 60 which expresses the distribution data, the second determination reference is set so as to define a region for good products and a region for bad products based on the distribution of data on good products and data on bad products within a range which includes at least the second range with respect to ignition delay.

In this manner, to focus on the ignition delay, for example, in the distribution data shown in FIG. 6, data on fuel which has a short ignition delay of approximately 3 to 4 ms and appears as a good product in appearance includes data on a bad product ("▲") which exhibits bad combustibility so that the fuel causes a combustion failure even in an actual ship. To the contrary, data on fuel which has a slightly long ignition delay of approximately 6 ms and appears as a bad product in appearance includes data on a good product ("•") which exhibits good combustibility so that the fuel does not cause a combustion failure even in an actual ship. Accordingly, a boundary by which a good product region and a bad product region are defined on the coordinate plane 60 based on the distribution of data on fuels which generate a combustion failure in an actual ship and fuels which do not generate a combustion failure in an actual ship is set as the second determination reference.

As shown in FIG. 6, in the distribution data according to this embodiment, the second determination reference is set as a straight line 81 which defines a region where data on good products are distributed and a region where data on bad products are distributed. In this example, the straight line 81 has the positive inclination (rightward and upward inclination) on the coordinate plane 60.

With respect to the second range (see symbol S1) which is set in accordance with the first determination reference on the coordinate plane 60, a region on an upper side of the straight line 81 which constitutes the second determination reference (a side where a flame spread rate is large) is a good product region (range), and a region on a lower side of the straight line 81 (a side where a flame spread rate is small) is a bad product region (range). Here, an area on the straight line 81 is suitably set either as the good product region (range) or the bad product region (range).

As explained above, in this embodiment, the straight line 81 which constitutes the second determination reference defines, based on the distribution data on a plurality of fuels whose goodness or badness of quality are determined as a result of an actual use of the fuels, within a range which includes the second range (see symbol S1) set in accordance with the first determination reference, a range of values of a flame spread rate indicative of good products which correspond to a value of ignition delay with respect to a flame spread rate. With respect to data on values of ignition delays and values of flame spread rates of the respective samples which constitute the distribution data, by using an average value of values measured plural times, for example, the determination accuracy in accordance with the second determination reference can be enhanced.

As described above, the first determination reference and the second determination reference which are used in the determination of goodness or badness of quality of fuel are set and stored in advance in the control part 7 provided to the fuel quality determination device 1 of this embodiment. That is, the control part 7 which functions as the analysis means for determining the quality of fuel as described above determines the goodness and the badness of quality of fuel using the first determination reference and the second determination reference.

Hereinafter, one example of steps of determining quality of fuel using the fuel quality determining method of this embodiment is explained in conjunction with FIG. 6 to FIG. 8. In the determination of fuel quality in this embodiment, firstly, a value of ignition delay and a value of a flame spread rate (ΔΔ/Δt value) of fuel which is an object to be determined are measured. That is, here, the steps of measuring the value of the ignition delay and the value of the flame spread rate of fuel which is an object to be determined are performed (FIG. 8, S10).

That is, in the fuel quality determination device 1, in measuring the ignition delay and the flame spread rate, the control part 7 controls the auxiliary combustion adjustment part 3 and the fuel supply part 4 so that a temperature in the combustion chamber 2 is set to a predetermined temperature and fuel which is an object to be determined is injected from the injection nozzle 13 and is burnt. Then, the control part 7 measures the ignition delay and the flame spread rate with respect to the fuel which is injected from the injection nozzle 13 and is the object to be determined. The measurement of the ignition delay and the flame spread rate with respect to the fuel which is an object to be determined is performed in an ambient state substantially equal to an ambient state in the combustion chamber 2 at the time of obtaining distribution data.

In the determination of fuel quality according to this embodiment, next, when a measured value of the ignition delay falls within a first range in accordance with the first determination reference, goodness or badness of quality of fuel which is an object to be determined is determined based on goodness or badness of quality of fuel determined in accordance with the first range. Here, a first step of determining goodness or badness of quality is performed as follows. That is, when a measured value of ignition delay falls within a range smaller than a predetermined value within the first range, it is determined that the quality of fuel which is an object to be determined is good, while when the measured value of ignition delay falls within a range larger than a second predetermined value which is larger than the predetermined value within the first range, it is determined that the quality of fuel which is an object to be determined is bad (FIG. 8, S20).

As shown in FIG. 6, in this embodiment, when a measured value of ignition delay falls within a range of 3 ms or less which is included in the first range (see a measurement point 91 indicated by a star symbol, for example), the ignition delay of fuel which is an object to be determined is apparently short and hence, it is determined that the fuel is a good product. On the other hand, when a measured value of ignition delay falls within a range of 6 ms or more which is included in the first range in the same manner (see a measurement point 92 indicated by a star symbol, for example), the ignition delay of fuel which is an object to be determined is apparently long and hence, it is determined that the fuel is a bad product. In this example, with respect to the measured value of ignition delay, 3 ms is defined as the predetermined value, and 6 ms is defined as the second predetermined value.

On the other hand, when a measured value of ignition delay falls within the second range in accordance with the first determination reference, goodness or badness of quality of fuel which is an object to be determined is determined based on whether or not a measured value of a flame spread rate falls within a good product range in accordance with the second determination reference. That is, here, a second step of determining goodness or badness of quality of fuel is performed such that when the measured value of ignition delay falls within the second range, goodness or badness of quality of fuel which is an object to be determined is determined based on whether or not the measured value of the flame spread rate falls within the good product range in accordance with the second determination reference (FIG. 8, S30).

As shown in FIG. 6, in this embodiment, when a measured value of ignition delay falls within the range of more than 3 ms and less than 6 ms (see symbol S1) which is the second range, the determination of goodness or badness of quality of fuel is performed using the straight line 81 which constitutes the second determination reference. To be more specific, in the region on the coordinate plane 60 where the ignition delay falls within the second range, when a value of flame spread rate falls within a larger range with reference to the straight line 81 which is the second determination reference (see measurement point 93 indicated by a star symbol, for example), it is determined that fuel which is an object to be determined is a good product.

On the other hand, in the region on the coordinate plane 60 where the ignition delay falls within the second range, when the value of flame spread rate falls within a smaller range with reference to the straight line 81 which is the second determination reference (see measurement point 94 indicated by a star symbol, for example), it is determined that fuel which is an object to be determined is a bad product.

Such determination of goodness or badness of quality of fuel is performed by the control part 7 in the fuel quality determination device 1. The above-mentioned steps of determining quality of fuel can be performed by making the control part 7 execute a predetermined program. This program may be a program which is installed in the control part 7 from a computer readable recording medium such as a CD-ROM, for example.

In this embodiment, with respect to the first determination reference used for determining quality of fuel, adopted is the method where the first range where goodness or badness of quality of fuel is univocally decided based on whether or not a value of ignition delay is 3 ms or less or 6 ms or more. However, setting of the first range is not limited to the setting adopted in this embodiment. As the first range, for example, only the range on the side where the value of the ignition delay is apparently large (for example, a range of 6 ms or more) or only the range on the side where the value of the ignition delay is apparently small (for example, a range of 3 ms or less) can be set.

In the former case, the range where the value of the ignition delay is 6 ms or more, for example, becomes the first range where it is univocally determined that fuel is a bad product is univocally decided. Also the range where the value of the ignition delay is less than 6 ms (a range of 0 to 6 ms) becomes the second range where the second determination reference is set. On the other hand, in the latter case, the range where the value of the ignition delay is 3 ms or less, for example, becomes the first range where the fact that fuel is a good product is univocally decided. Also the range where the value of the ignition delay exceeds 3 ms becomes the second range where the second determination reference is set.

The first determination reference may be set based on distribution data. That is, the first determination reference may be set in advance corresponding to a temperature in the combustion chamber 2 or the like, for example, without being based on distribution data, or the first determination reference may be set based on distribution data in the same manner as the second determination reference.

According to the determination of fuel quality in this embodiment described above, by introducing the parameter referred to as flame spread rate indicative of combustibility immediately after ignition of fuel in addition to parameter referred to as ignition delay indicative of ignitability of fuel as an index for the evaluation of the combustion state of fuel, quality of fuel can be grasped from both sides, that is, ignitability and combustibility of fuel and hence, determination of quality can be performed with high accuracy. Further, the determination references with respect to ignition delay and a flame spread rate are set based on sample data (distribution data) of fuels which are actually used in an engine for a ship or the like and with which it is found whether or not a combustion failure occurs and hence, the goodness or badness of combustibility which is largely relevant to goodness or badness of quality of fuel can be explicitly evaluated thus enhancing reliability of determination of quality.

Particularly, the determination of fuel quality according to this embodiment is characterized in that goodness and badness of quality of fuel can be distinguished from each other by the addition of a result of evaluation of actually used fuels. According to such a technical feature, compared to a conventional method where a combustion state of fuel is estimated from a rate of heat generation based on a change in pressure in a combustion chamber or the like, the accuracy of determination of fuel quality can be enhanced. Further, in setting the determination references with respect to ignition delay and a flame spread rate, by increasing the number of data with respect to sample data (distribution data) of fuel whose goodness or badness of quality is already known, the accuracy of the determination can be enhanced. As described above, according to the determination of fuel quality according to this embodiment, the presence or the non-presence of occurrence of an engine trouble which is brought about by an actual use of fuel can be reflected on the determination of fuel quality and hence, the reliability and accuracy of determination of quality can be enhanced.

In the fuel quality determining method according to this embodiment described above, as determination references, two determination references, that is, the first determination reference which is the determination reference with respect to ignition delay and the second determination reference which is the determination reference with respect to the flame spread rate corresponding to a value of ignition delay are used. However, only the second determination reference may be used as the determination reference.

In this case, only fuel whose a measured value of ignition delay falls within a range where goodness or badness of quality of fuel is not univocally decided is used as an object to be determined in the determination of goodness or badness using the second determination reference as the determination reference, and fuels other than such a fuel are not used as an object to be determined in the determination of goodness or badness using the determination reference. In other words, in the above-mentioned fuel quality determining method, when a measured value of ignition delay falls within a range corresponding to a case where the first determination reference is used, the fuel is excluded from an object to be determined in advance or in the above-mentioned steps of determining quality of fuel. That is, in this case, in the above-mentioned steps of determining quality of fuel, only the second determination of goodness or badness (FIG. 8, S30) is performed as the determination of goodness or badness.

To be more specific, as shown in FIG. 6, when a measured value of ignition delay falls within the range of 3 ms or less which is included in the first range, and when a measured value of ignition delay falls within the range of 6 ms or more which is included in the first range, fuel with which the ignition delay is measured is excluded from an object to be determined in the determination of goodness or badness of quality of fuel. That is, in these cases, the goodness or badness of quality of fuel is univocally decided and hence, the above-mentioned determination of goodness or badness of quality of fuel using the first determination reference is not performed.

Then, when a measured value of ignition delay falls within the second range, using the second determination reference as the determination reference, in accordance with the second determination reference (straight line 81), goodness or badness of quality of fuel which is an object to be determined is determined based on whether or not a measured value of a flame spread rate falls within a range of a good product. In this manner, only fuel whose goodness or badness of quality of fuel cannot be univocally decided based on a measured value of ignition delay can be used as an object to be determined in the determination of goodness or badness using the determination reference (second determination reference). By adopting such a method, processing in the determination of goodness or badness of quality of fuel can be simplified.

Further, in the determination of fuel quality according to this embodiment, the determination of fuel quality can be also performed based on distribution data acquired in a plurality of different temperature states in the combustion chamber 2. This is because combustibility (flame spread rate) of fuel is relatively largely influenced by the temperature of an ambient gas as described previously.

To be more specific, the lower the temperature in the combustion chamber 2, the larger the tendency where fuel is determined as a good product and the tendency where fuel is determined as a bad product with respect to the ignition delay and the flame spread rate and hence, it is possible to clearly distinguish a region of good products and a region of bad products from each other based on distribution data. In other words, the higher the temperature in the combustion chamber 2, the more indefinite the distinction between the region of good products and the region of bad products based on distribution data becomes.

Accordingly, in the case where it is difficult to set of the second determination reference based on distribution data obtained in a state where a temperature in the combustion chamber 2 is a certain temperature, the determination based on the second determination reference may be performed based on the determination reference based on distribution data obtained in a state where the temperature in the combustion chamber 2 is a temperature lower than the certain temperature.

Figure 7:
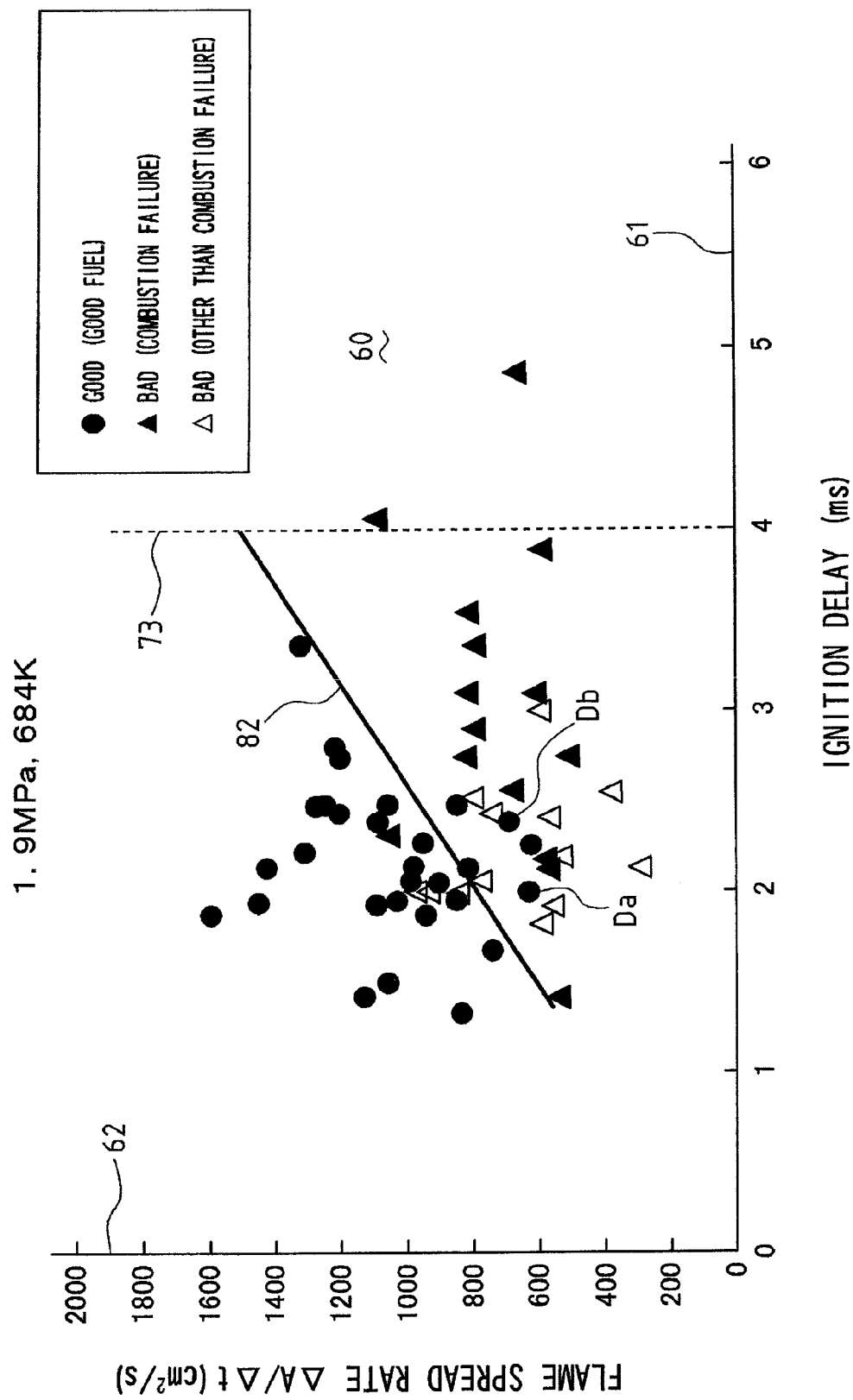
FIG. 7 is an explanatory view of the fuel quality determining method according to one embodiment of the present invention.
Figure 8:
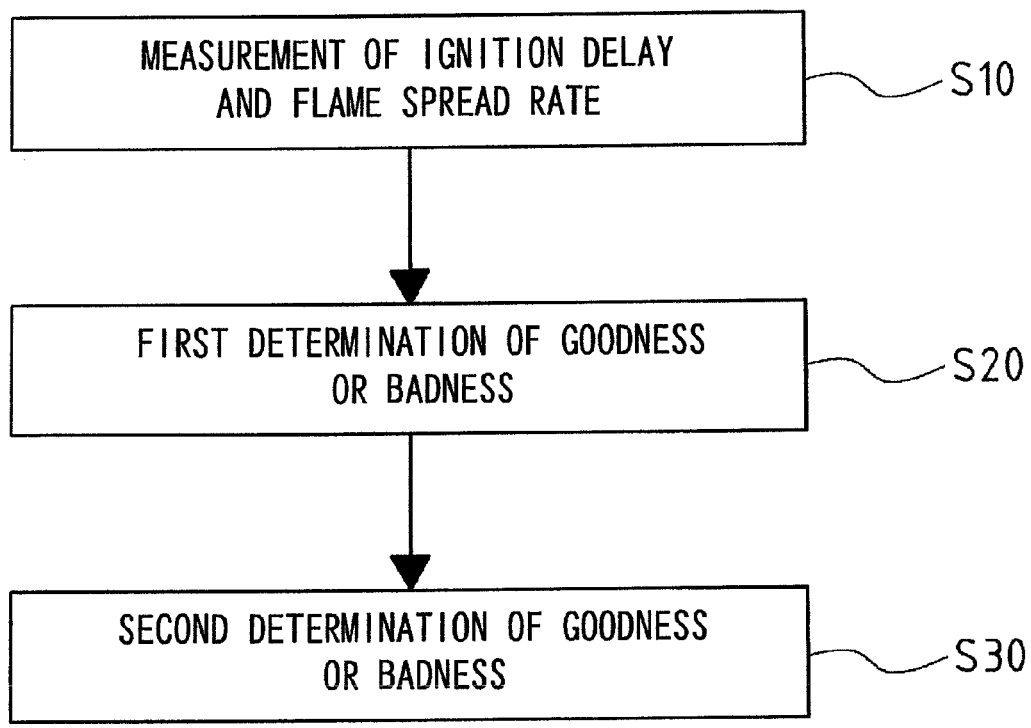
FIG. 8 is a flowchart of the fuel quality determining method according to one embodiment of the present invention.

FIG. 7 shows distribution data obtained in an ambient state where a pressure in the combustion chamber 2 is 1.9 MPa and a temperature in the combustion chamber 2 is 684K. The distribution data shown in FIG. 7 is data of a case where the same fuel is used and the ambient temperature in the combustion chamber 2 is relatively high with respect to the relationship with the distribution data shown in FIG. 6.

When the determination of fuel quality according to this embodiment is performed in the environment where the distribution data shown in FIG. 7 is acquired, firstly, as the first determination reference, for example, a range where a value of the ignition delay is 4 ms or more (see reference line 73) is set. That is, when the measured value of the ignition delay with respect to the fuel which is an object to be determined is 4 ms or more, because of apparently long ignition delay, it is determined that quality of the fuel exhibiting such a value of ignition delay is bad.

On the other hand, when the measured ignition delay with respect to fuel which is an object to be determined is less than 4 ms, in the distribution data shown in FIG. 7, a second determination reference which is set as the straight line 82, for example, is used. In this example, the straight line 82 has the positive inclination (rightward and upward inclination) on the coordinate plane 60 in the same manner as the straight line 81 shown in FIG. 6 which constitutes the second determination reference.

However, when the straight line 82 is used as the second determination reference, data on good fuel is included in a bad product region (a region below the straight line 82) (see data Da, Db, for example). That is, in the distribution data obtained in a state where an ambient temperature in the combustion chamber 2 is relatively high such as 684K, setting of the second determination reference is difficult, and there may be a case where a result of an actual use of fuel (the presence or the non-presence of combustion failure) is not sufficiently reflected.

Accordingly, when the distribution data shown in FIG. 7 is acquired, the determination of quality of the fuel is performed using the distribution data acquired at a relatively low temperature (648K) shown in FIG. 6, for example. In the distribution data shown in FIG. 6, as described previously, the tendency where fuel is determined as a good product and the tendency where fuel is determined as a bad product with respect to ignition delay and a flame spread rate are large and hence, it is possible to clearly distinguish a region of a good product and a region of a bad product from each other based on distribution data. Accordingly, in the distribution data acquired in a state where a temperature in the combustion chamber 2 is relatively high temperature as shown in FIG. 7, data on good products (see data Da, Db, for example) which are positioned below the straight line 82 which constitutes the second determination reference on the coordinate plane 60 are positioned above the straight line 81 which constitutes the second determination reference on the coordinate plane 60, that is, in the region of good products as shown in FIG. 6 due to lowering of the temperature in the combustion chamber 2.

Accordingly, when it is difficult to set the second determination reference based on the distribution data acquired in a state where a temperature in the combustion chamber 2 is a certain predetermined temperature (when the determination whether or not a measured value of a flame spread rate falls within the above-mentioned region (range) of good products in accordance with the second determination reference cannot be performed), the determination of fuel quality is performed using the determination reference based on the distribution data acquired at a temperature lower than such a temperature. In the case of the distribution data shown in FIG. 6 and FIG. 7, when measured ignition delay with respect to a fuel which is an object to be determined is less than 4 ms in the distribution data shown in FIG. 7, the determination of fuel quality is performed using the first determination reference and the second determination reference which are decided based on the distribution data shown in FIG. 6 acquired in a state where a temperature in the combustion chamber 2 is relatively low. With respect to the first determination reference, a common first determination reference may be used among a plurality of different temperature states in the combustion chamber 2, or first determination references corresponding to distribution data in respective temperature state may be used.

In this manner, in the determination of fuel quality according to this embodiment, in the case where the determination whether or not a measured value of a flame spread rate falls within a good product range based on the straight line 82 which constitutes the second determination reference cannot be performed, the determination whether or not the measured value of a flame spread rate falls within a good product range may be performed based on the straight line 81 which constitutes the second determination reference in accordance with the distribution data obtained at a temperature (648K) lower than a temperature (684K) in the combustion chamber 2 when the distribution data is obtained in such a case. Here, the case where the determination whether or not a measured value of a flame spread rate falls within a good product range in accordance with the second determination reference cannot be performed means, for example, a case where data on good products (data Da, Db and the like, for example) are present below the straight line 82 which constitutes the second determination reference as described previously, for example.

In this manner, in the determination of fuel quality according to this embodiment, the lower the temperature in the combustion chamber 2, the more clear the distinction between the distribution of data on good products and the distribution of data on bad products on the distribution data becomes. From the distribution data shown in FIG. 6 and FIG. 7, it is safe to say that the lower the temperature in the combustion chamber 2, the smaller the inclination of the straight line which is set as the second determination reference on the coordinate plane 60 becomes, Although the second determination reference is set as a straight line on the coordinate plane 60 in this embodiment, the second determination reference may be a curve, or may be a line which defines a closed region.

Further, a plurality of first determination references and a plurality of second determination references may be set in advance for respective temperatures in the combustion chamber 2 based on distribution data acquired in a plurality of different temperature states in the combustion chamber 2. In this case, the plurality of first determination references and the plurality of second determination references which are set for respective temperatures in the combustion chamber 2 are used such that, for example, the temperatures in the combustion chamber 2 when the distribution data for setting the respective determination references is acquired becomes a temperature equal to or closest to the temperatures in the combustion chamber 2 when fuel which is an object to be determined is burnt.

To explain the above more specifically using distribution data shown in FIG. 6 and FIG. 7, two sets of determination references are set. That is, one set of determination references consisting of the first determination reference and the second determination reference corresponding to the distribution data (FIG. 6) acquired in a state where the temperature in the combustion chamber 2 is a relatively low temperature of 648K, and another set of determination reference consisting of the first determination reference and the second determination reference corresponding to the distribution data (FIG. 7) acquired in a state where a temperature in the combustion chamber 2 is a relatively high temperature of 684K are set. Then, when the first determination reference and the second determination reference corresponding to the distribution data at the relatively low temperature are used, the temperature in the combustion chamber 2 at the time of burning the fuel which is an object to be determined is adjusted to a relatively low temperature (648K). In the same manner, when the first determination reference and the second determination reference corresponding to the distribution data at the relatively high temperature are used, the temperature in the combustion chamber 2 at the time of burning fuel which is an object to be determined is adjusted to a relatively high temperature (684K).

As described above, by using and setting the determination reference for performing the determination of the quality of fuel corresponding to a temperature in the combustion chamber 2, the reliability and accuracy of determination of quality can be more enhanced.

Further, in the determination of fuel quality according to this embodiment, it is preferable that the first determination reference and the second determination reference for performing the determination of fuel quality, and measurement points which constitute measured data with respect to fuel which is an object to be determined are displayed by a predetermined display means.

In this embodiment, as shown in FIG. 6, on the coordinate plane 60 which has the first coordinate axis 61 indicative of a value of ignition delay and the second coordinate axis 62 indicative of a value of a flame spread rate, the reference lines 71, 72 indicative of the first determination reference and the straight line 81 which is a reference line indicative of the second determination reference are displayed. The reference lines 71, 72 indicative of the first determination reference are reference lines which define the first range and the second range. Further, points on the coordinate plane 60 which are decided based on a measured value of the ignition delay and the measured value of the flame spread rate with respect to fuel which is an object to be determined are displayed as measurement points 91, 92, 93, and 94. Further, also in FIG. 7, in the same manner as FIG. 6, the reference line 73 indicative of the first determination reference and the straight line 82 which is a reference line indicative of the second determination reference are displayed on the coordinate plane 60. Further, points on the coordinate plane 60 which are decided based on a measured value of ignition delay and a measured value of a flame spread rate with respect to fuel which is an object to be determined are displayed as measurement points.

For such a display, in the fuel quality determination device 1 according to this embodiment, as shown in FIG. 1, the control part 7 includes a display part 8 for displaying the coordinate plane 60 shown in FIG. 6 and FIG. 7. That is, the display part 8 displays, on the coordinate plane 60, the reference lines (reference line 71 and the like) indicative of the first determination reference and the reference line (straight line 81 or the like) indicative of the second determination reference, and also displays points on the coordinate plane 60 which are decided based on measured values of ignition delay and measured values of a flame spread rate with respect to fuel which is an object to be determined as measurement points (measurement point 91 and the like).

As the display part 8 which the control part 7 has, a suitable display means such as a liquid crystal display attached to a computer, a display connected to an external device, a CRT (cathode ray tube) or television receiver set is used.

In this manner, by performing the display of the first determination reference and the second determination reference for determining goodness or badness of quality of fuel and the display of measurement points with respect to fuel which is an object to be determined, a result of determination of fuel quality can be easily visually grasped. Further, by performing the above-mentioned display, it is possible to acquire not only the result of determination of goodness or badness of quality but also the relationship between the first determination reference and the second determination reference with the measurement points and hence, quality of fuel can be evaluated from a viewpoint of the level at which the fuel which is an object to be determined exhibits ignitability and combustibility whereby (upon which) classification of fuel by grade or the like can be performed.

Further, in the display part 8, the distribution data shown in FIG. 6 or FIG. 7 are also suitably displayed. Due to such a display, the relationship between data on fuel whose ignition delay, flame spread rate and the presence or the non-presence of combustion failure are known and data on ignition delay and a flame spread rate of the object to be determined can be grasped and hence, the more detailed analysis of the fuel which is an object to be determined can be performed.

In the embodiment of the present invention which has been explained heretofore, fuel which is an object to be determined is diesel fuel (bunker oil) for a marine engine. However, the present invention is broadly applicable to inspection of quality of liquid fuel such as biodiesel fuel, alcoholic fuel or other synthetic fuel besides petroleum-based fuel including diesel fuel. Accordingly, the present invention is broadly developed in a technical field where the evaluation of quality of fuel is necessary such as a marine engineering field or a mechanical engineering field.

The invention claimed is:

1. A fuel quality determining method for determining quality of fuel based on a combustion state of the fuel by injecting the fuel into a combustion chamber and burning the fuel, comprising providing a coordinate plane which has a coordinate axis which indicates a value of ignition delay which is a time from fuel injection to fuel ignition and a coordinate axis which indicates a value of a flame spread rate which is an increase rate of a flame from a point of time immediately after fuel is ignited with respect to a plurality of fuels whose quality is determined to be good or bad based on the presence or the non-presence of a combustion failure as a result of an actual use of the fuels are already known, defining a first range which is at least either one of a range where a value of the ignition delay is smaller than a predetermined value with respect to the ignition delay and a range where the value of ignition delay is larger than a second predetermined value which is larger than the predetermined value with respect to the ignition delay, the first range being a range where whether quality of fuel is good or bad is unequivocally decided based on the value of ignition delay, and defining a second range which is a range between the predetermined value and the second predetermined value and in which whether the quality of fuel is good or bad is not unequivocally decided based on the value of the ignition delay, the second range being defined based on the distribution of the respective values on the coordinate plane, providing a determination reference which defines a range of values of the flame spread rate indicative of good products corresponding to the values of the ignition delay on the coordinate plane with respect to the flame spread rate within a range which includes the second range based on the distribution with respect to the plurality of materials, and measuring the value of ignition delay and the value of flame spread rate with respect to fuel which is an object to be determined, wherein the quality of the fuel which is an object to be determined is determined to be good when the measured value of the ignition delay falls within a range smaller than the predetermined value within the first range, and the quality of the fuel which is an object to be determined is determined to be bad when the measured value of the ignition delay falls within a range larger than the second predetermined value within the first range, and wherein whether quality of the fuel is good or bad which is an object to be determined is determined based on whether or not the measured value of the flame spread rate falls within the good product range in accordance with the determination reference when the measured value of the ignition delay falls within the second range.

2. The fuel quality determining method according to claim 1, further comprising displaying on the coordinate plane a reference line which defines the first range and the second range and a reference line which indicates the determination reference, and displaying on the coordinate plane, as measurement points, points on the coordinate plane which are decided based on the measured values of the ignition delay and the measured values of flame spread rate with respect to the fuel which is an object to be determined.

3. The fuel quality determining method according to claim 1, wherein in the case where the determination on whether or not the measured value of fuel spread rate falls within the good product range is not possible based on the determination reference, using the determination reference based on the distribution obtained at a temperature lower than a temperature in the combustion chamber when the distribution is obtained with respect to the plurality of fuels in the case, the determination on whether or not the measured value of the flame spread rate falls within the good product range is performed.

4. A computer readable medium encoded with a computer program for making a computer execute the fuel quality determining method described in claim 1, the program making the computer execute steps comprising:

measuring a value of ignition delay and a value of flame spread rate with respect to the fuel which is an object to be determined;

determining quality of the fuel which is an object to be determined good when the measured value of the ignition delay falls within the range smaller than the predetermined value within the first range, and determining quality of the fuel which is an object to be determined bad when the measured value of ignition delay falls within the range larger than the second predetermined value within the first range; and determining whether the quality of the fuel is good or bad which is an object to be determined based on whether or not the measured value of the flame spread rate falls within the good product range in accordance with the determination reference when the measured value of the ignition delay falls within the second range.

5. A fuel quality determination device comprising:

a combustion chamber in which fuel injected from an injection nozzle is burnt;

a temperature adjustment means for adjusting a temperature in the combustion chamber before the injecting the fuel into the combustion chamber by the injection nozzle;

an injection control means for controlling the injection of the fuel by the injection nozzle;

a light detecting means for detecting light of a flame generated by the combustion of the fuel in the combustion chamber;

a combustion imaging means for acquiring continuous image data including a manner of combustion of the fuel in the combustion chamber by imaging the inside of the combustion chamber;

an ignition delay measurement means for measuring ignition delay which is a time from the injection of the fuel by the injection nozzle to the ignition of the fuel based on the detection of the light by the light detecting means;

a flame spread rate measurement means for measuring a flame spread rate which is an increase rate of the flame immediately after the ignition of the fuel injected by the injection nozzle based on the image data acquired by the combustion imaging means; and an analysis means for determining quality of the fuel based on the measured value of the ignition delay measured by the ignition delay measurement means and the measured value of the flame spread rate measured by the flame spread rate measurement means, wherein the analysis means provides a coordinate plane in such a manner that the coordinate plane has a coordinate axis which indicates a value of ignition delay which is a time from fuel injection to fuel ignition and a coordinate axis which indicates a value of a flame spread rate which is an increase rate of a flame from a point of time immediately after fuel is ignited with respect to a plurality of fuels whose quality is determined to be either good or bad based on the presence or the non-presence of a combustion failure as a result of an actual use of the fuels are already determined, the analysis means defines a first range which is at least either one of a range where a value of the ignition delay is smaller than a predetermined value with respect to the ignition delay and a range where the value of ignition delay is larger than a second predetermined value which is larger than the predetermined value with respect to the ignition delay and in which whether quality of fuel is good or bad is unequivocally decided based on the value of ignition delay, and the analysis means defines a second range which is a range between the predetermined value and the second predetermined value and in which whether quality of fuel is good or bad is not unequivocally decided based on the value of the ignition delay, the second range being defined based on the distribution of the respective values on the coordinate plane, the analysis means uses a determination reference which defines a range of values of the flame spread rate indicative of good products which correspond to the values of the ignition delay on the coordinate plane with respect to the flame spread rate within a range which includes the second range based on the distribution with respect to the plurality of materials, the analysis means sets a temperature in the combustion chamber to a predetermined temperature by controlling the temperature adjustment means and the injection control means, and injects fuel which is an object to be determined from the injection nozzle and burns the fuel, the analysis means determines quality of the fuel which is an object to be determined good when the measured value of the ignition delay falls within the range smaller than the predetermined value within the first range, and determines quality of the fuel which is an object to be determined bad when the measured value of ignition delay falls within the range larger than the second predetermined value within the first range; and the analysis means determines whether the quality of the fuel is good or bad which is an object to be determined based on whether or not the measured value of the flame spread rate falls within the good product range in accordance with the determination reference when the measured value of the ignition delay falls within the second range.

6. The fuel quality determining device according to claim 5, wherein the analysis means further comprises: a display part which displays a reference line which defines the first range and the second range and a reference line which indicates the determination reference on the coordinate plane, and displays points on the coordinate plane which are decided based on the measured values of the ignition delay and the measured values of flame spread rate with respect to the fuel which is an object to be determined on the coordinate plane as measurement points.

7. The fuel quality determining method according to claim 5, wherein the analysis means, in the case where the determination on whether or not the measured value of fuel spread rate falls within the good product range is not possible based on the determination reference, determines whether or not the measured value of the flame spread rate falls within the good product range using the determination reference based on the distribution obtained at a temperature lower than a temperature in the combustion chamber when the distribution is obtained with respect to the plurality of fuels.

* * * * *